(12) United States Patent
Takada et al.

(10) Patent No.: US 9,696,814 B2
(45) Date of Patent: Jul. 4, 2017

(54) INFORMATION PROCESSING DEVICE, GESTURE DETECTION METHOD, AND GESTURE DETECTION PROGRAM

(71) Applicant: CLARION CO., LTD., Saitama-shi, Saitama (JP)

(72) Inventors: Shintaro Takada, Tokyo (JP); Takashi Matsubara, Tokyo (JP); Naoki Mori, Tokyo (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 14/769,896

(22) PCT Filed: Apr. 25, 2014

(86) PCT No.: PCT/JP2014/061742
§ 371 (c)(1),
(2) Date: Aug. 24, 2015

(87) PCT Pub. No.: WO2015/037268
PCT Pub. Date: Mar. 19, 2015

(65) Prior Publication Data
US 2016/0004321 A1    Jan. 7, 2016

(30) Foreign Application Priority Data

Sep. 11, 2013    (JP) .................................. 2013-188625

(51) Int. Cl.
*G06F 3/01*    (2006.01)
*G02B 27/01*    (2006.01)
(Continued)

(52) U.S. Cl.
CPC ............. *G06F 3/017* (2013.01); *G02B 27/01* (2013.01); *G02B 27/0101* (2013.01);
(Continued)

(58) Field of Classification Search
None
See application file for complete search history.

(56) References Cited

U.S. PATENT DOCUMENTS

| 2013/0076881 A1 | 3/2013 | Takahashi et al. |
| 2013/0097557 A1 | 4/2013 | Madau et al. |
| 2013/0187845 A1 | 7/2013 | Madau et al. |

FOREIGN PATENT DOCUMENTS

| JP | 2007-034515 A | 2/2007 |
| JP | 2008-210239 A | 9/2008 |

(Continued)

*Primary Examiner* — Kenneth B Lee, Jr.
(74) *Attorney, Agent, or Firm* — Volpe and Koenig, P.C.

(57) ABSTRACT

It is possible to operate a device while reducing erroneous recognition of a device even when a line of sight does not face the device in an accurate direction. An information processing device that detects a motion of a user includes a detecting unit that detects the motion of the user and a face direction of the user from an image photographed by an imaging unit, a detected motion determining unit that determines whether or not the motion detected by the detecting unit is an operation on the information processing device based on the face direction of the user and position information of the information processing device stored in a storage unit, and a display content control unit that causes a display unit to reflect the motion when the detected motion determining unit determines that the motion detected by the detecting unit is the operation on the information processing device.

11 Claims, 19 Drawing Sheets

(51) Int. Cl.
*G06K 9/00* (2006.01)
*G06T 7/20* (2017.01)
*G06T 7/70* (2017.01)

(52) U.S. Cl.
CPC ......... *G06F 3/013* (2013.01); *G06K 9/00275* (2013.01); *G06K 9/00335* (2013.01); *G06K 9/00604* (2013.01); *G06T 7/20* (2013.01); *G06T 7/70* (2017.01); *G02B 2027/014* (2013.01); *G06T 2207/10048* (2013.01); *G06T 2207/30201* (2013.01); *G06T 2207/30268* (2013.01)

(56) References Cited

FOREIGN PATENT DOCUMENTS

| | | |
|---|---|---|
| JP | 2009-037434 A | 2/2009 |
| JP | 2010-184600 A | 8/2010 |
| JP | 2011-116248 A | 6/2011 |
| JP | 2013-069181 A | 4/2013 |
| JP | 2013-082445 A | 5/2013 |
| JP | 2013-149257 A | 8/2013 |

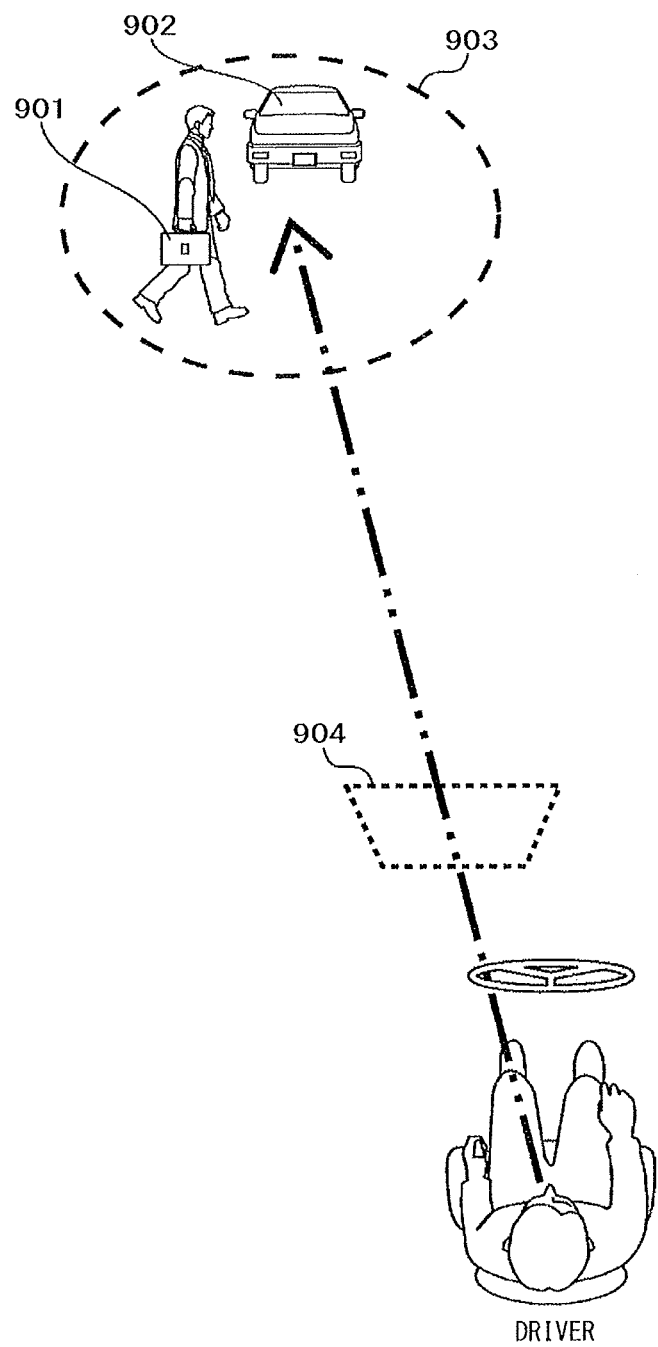

INFORMATION PROCESSING DEVICE, GESTURE DETECTION METHOD, AND GESTURE DETECTION PROGRAM

TECHNICAL FIELD

The present invention relates to an information processing device, a gesture detection method, and a gesture detection program, which are capable of operating, for example, an in-vehicle device installed in a vehicle by a gesture.

BACKGROUND ART

In the present circumstances, for example, a touch operation on a screen and an operation on a switch attached to a jog dial or a handle have been widely spread as an operation on an in-vehicle device in a vehicle. As the in-vehicle device serving as an operation target, in addition to a navigation system installed in a center display, an air conditioner, and an audio device, a head up display (HUD) that projects information on a front glass of a vehicle has been recently spread. Under this background, an operation based on a gesture has been introduced as an operation on an in-vehicle device since an operation is intuitive, time and effort of an operation is reduced, and a period of time in which a line of sight is turned away at the time of an operation is reduced.

For example, Patent Document 1 discloses a technique in which a driver's hand motion toward an image display device displaying a switch operation portion is photographed by a camera, a computer displays a response indicating that the switch operation portion has been operated when the operation is determined to be an operation on the switch operation portion based on image information, a sensor detects a start motion for starting an operation and an end motion for ending an operation, and the camera starts or ends the photography according to a detection signal.

Further, Patent Document 2 discloses a technique in which a control unit detects a line-of-sight direction or motion of a user based on an image photographed by an imaging unit as motion on an electrical device, and a process of controlling a status of the electrical device is performed according to the detected line-of-sight direction or motion of the user.

CITATION LIST

Patent Document

Patent Document 1: JP 2010-184600 A
Patent Document 2: JP 2007-034515 A

SUMMARY OF THE INVENTION

Problems to be Solved by the Invention

However, in the technique disclosed in Patent Document 1, since the start motion for detecting a gesture is necessary, it is difficult to perform a seamless quick operation. Further, the end motion is necessary to end the gesture, and thus time and effort of an operation increases. In addition, a hand gesture that the driver has performed toward a pedestrian or a driver outside a vehicle is recognized mistakenly as a gesture performed with an intention to operate a device in a vehicle (for example, display content of a HUD), leading to an erroneous operation or a malfunction of a device.

In the technique disclosed in Patent Document 2, since the line-of-sight direction is detected, an erroneous operation or a malfunction of a device caused by erroneous gesture recognition can be reduced. However, since the line-of-sight direction is decided in a pinpoint manner, there is a problem in that there are cases in which the device does not operate if the line of sight does not face the device in an accurate direction.

The present invention was made in light of the foregoing, and it is an object of the present invention to provide a gesture detection device, a gesture detection method, and a gesture detection program, which are capable of reducing erroneous recognition of the device and operating the device even when the line of sight does not face the device in the accurate direction.

Solutions to Problems

In order to solve the above problems and achieve the above object, an information processing device according to the present invention is an information processing device that detects a motion of a user, and includes a detecting unit that detects the motion of the user and a face direction of the user from an image photographed by an imaging unit, a detected motion determining unit that determines whether or not the motion detected by the detecting unit is an operation on the information processing device based on the face direction of the user and position information of the information processing device stored in a storage unit in advance, and a display content control unit that causes a display unit to reflect the motion when the detected motion determining unit determines that the motion detected by the detecting unit is the operation on the information processing device.

Further, an information processing device according to the present invention is an information processing device that detects a motion of a user, and includes a detecting unit that detects the motion of the user from an image photographed by an imaging unit, a gaze area calculating unit that calculates a gaze area of the user based on a line-of-sight direction and a distance of sight of the user, a virtual image area calculating unit that causes a display unit to display a virtual image of the information processing device, and calculates a virtual image area serving as an area of the displayed virtual image, a detected motion determining unit that determines whether or not the motion detected by the detecting unit is an operation on the information processing device based on the gaze area calculated by the gaze area calculating unit and the virtual image area calculated by the virtual image area calculating unit, and a display content control unit that causes the display unit to reflect the motion when the detected motion determining unit determines that the motion detected by the detecting unit is the operation on the information processing device.

Further, an information processing device according to the present invention is an information processing device that detects a motion of a user, and includes a first detecting unit that detects the motion of the user from an image photographed by an imaging unit photographing the user, a second detecting unit that detects a moving object from an outside image photographed by an outside imaging unit photographing an outside, a gaze area calculating unit that calculates a gaze area of the user based on a line-of-sight direction and a distance of sight of the user, a moving object position calculating unit that calculates a position of the moving object detected by the second detecting unit, a detected motion determining unit that determines whether or not the motion detected by the first detecting unit is an operation on the information processing device based on the gaze area and the position of the moving object, and a display content control unit that causes a display unit to reflect the motion when the detected motion determining unit determines that the motion detected by the detecting unit is the operation on the information processing device.

The present invention is also understood as a gesture detection method and a gesture detection program executed by the information processing device.

Effects of the Invention

According to the present invention, it is possible to reduce erroneous recognition of the device and operate the device even when the line of sight does not face the device in an accurate direction.

BRIEF DESCRIPTION OF THE DRAWINGS

FIG. 9A illustrates a positional relation between a gaze area of a driver and a pedestrian or another vehicle.

MODE FOR CARRYING OUT THE INVENTION

Hereinafter, embodiments of an information processing device, a gesture detection method, and a gesture detection program according to the present invention will be described in detail with reference to the appended drawings.

First Embodiment

Figure 1A:
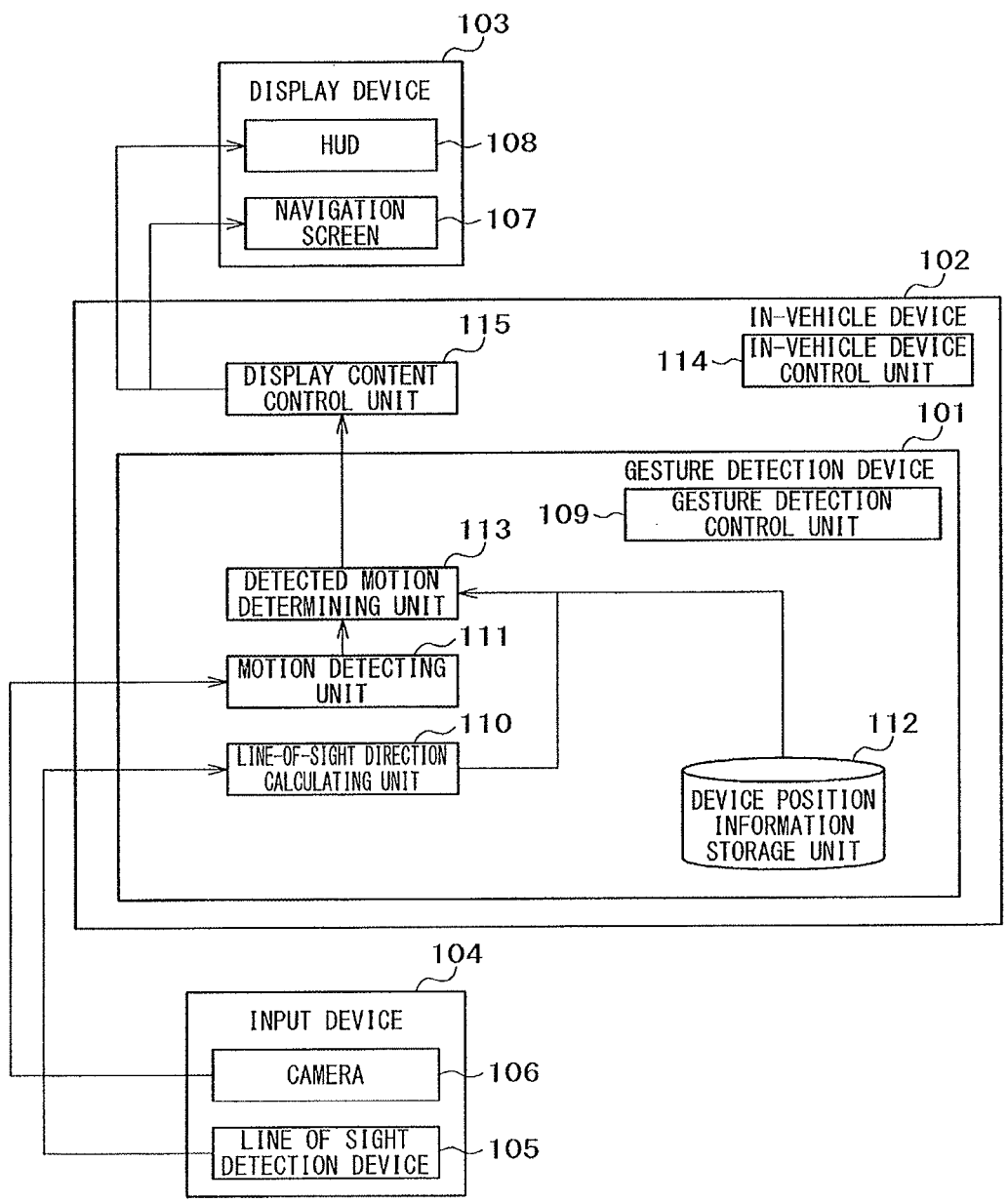
FIG. 1A is a configuration diagram (line-of-sight direction determination) of an in-vehicle device system according to a first embodiment of the present invention.

FIG. 1A is a configuration diagram of an in-vehicle device system equipped with a gesture detection device 101 according to the present embodiment. The present in-vehicle device system includes an in-vehicle device 102 including the gesture detection device 101, a display device 103, and an input device 104.

The input device 104 includes a line of sight detection device 105 and a camera 106, and the line of sight detection device 105 identifies directions of pupils of left and right eyeballs of the driver from an image photographed by the camera 106, and outputs information of the line-of-sight direction. As an example, the line of sight detection device 105 includes a light emitting diode (LED) that radiates infrared rays and an infrared (IR) camera that acquires only infrared light. The display device 103 is configured to include a navigation screen 107 and a HUD 108, and the HUD 108 projects and displays various information on a front glass of a vehicle.

The in-vehicle device 102 includes the gesture detection device 101, an in-vehicle device control unit 114, and a display content control unit 115. The in-vehicle device control unit 114 controls an operation of the in-vehicle device, and the display content control unit 115 controls content displayed on the display device 103. Specifically, the display content control unit 115 performs decision of the layout of content of information to be displayed or a video to be displayed, decision of a position of an image (virtual image) used to cause the driver to recognize display content, display of content in which a result of an operation instructed from the user is reflected, and the like. For example, the in-vehicle device control unit 114 is configured with an arithmetic device such as a central processing unit (CPU). The display content control unit 115 transmits information to be displayed on the HUD 108 to the gesture detection device 101. The in-vehicle device 102 performs a basic function of a car navigation system.

The gesture detection device 101 is configured to include a gesture detection control unit 109, a line-of-sight direction calculating unit 110, a motion detecting unit 111, a device position information recording unit 112, and a detected motion determining unit 113. The gesture detection control unit 109 detects a gesture, and controls a series of operations until it is determined whether or not a detection result is an operation on a device. The line-of-sight direction calculating unit 110 calculates a direction in which the line of sight of the driver faces in the vehicle based on direction information of left and right eyeballs obtained from the line of sight detection device 105. The motion detecting unit 111 determines whether or not the driver's motion matches a previously specified motion pattern based on moving image information obtained from the camera 106, and recognizes and detects a specified motion. The device position information storage unit 112 stores positions in which the navigation screen 107 and the HUD 108 are installed in the vehicle in the form of three-dimensional (3D) coordinates. The detected motion determining unit 113 receives information from the motion detecting unit 111, the line-of-sight direction calculating unit 110, and the device position information recording unit 112 as input information, and determines whether or not the motion of the driver detected by the motion detecting unit 111 is a motion performed with an intention to operate the device.

Figure 2A:
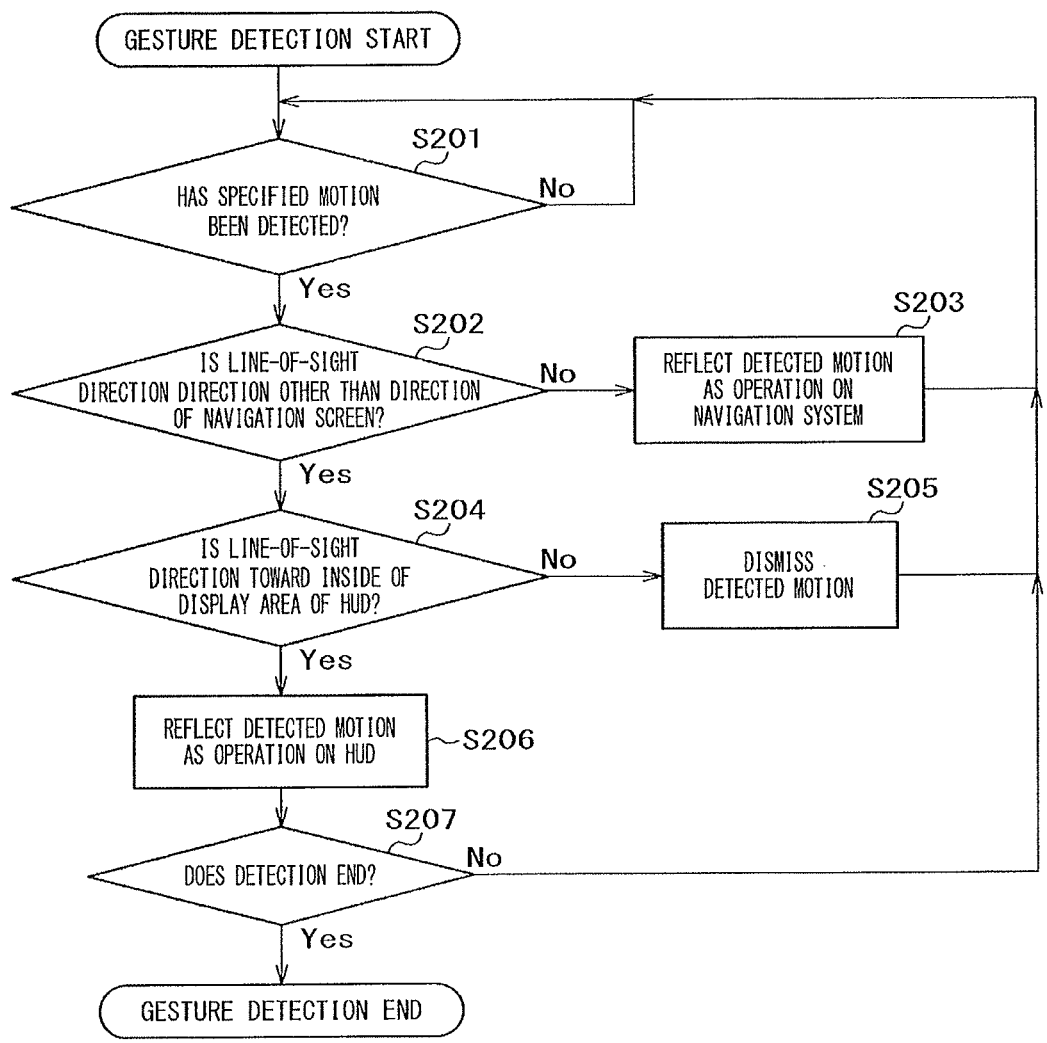
FIG. 2A is an operation flow (line-of-sight direction determination) at the time of gesture detection according to the first embodiment of the present invention.

A processing procedure of a process (a gesture detection process) of detecting a gesture performed with an intention to operate the device by the driver will be described in detail with reference to an operation flow of FIG. 2A. For example, a method disclosed in JP 2012-187190 A may be used for a line-of-sight direction detection process and a face direction detection process which will be described below.

First, the driver gesture detection starts, for example, when the in-vehicle device 102 is powered on. For example, the motion detecting unit 111 determines whether or not the driver has performed a previously specified motion (a motion registered as a gesture to operate the device) based on an input video of the camera 106 (S201), and performs the detection continuously when the specified motion is determined to have been not detected (No in S201). On the other hand, when the motion detecting unit 111 determines that the specified motion have been detected (Yes in S201), the line-of-sight direction calculating unit 110 calculates the line-of-sight direction of the driver when the gesture is detected based on the directions of the eyeballs of the driver obtained from the line of sight detection device 105.

Figure 3A:
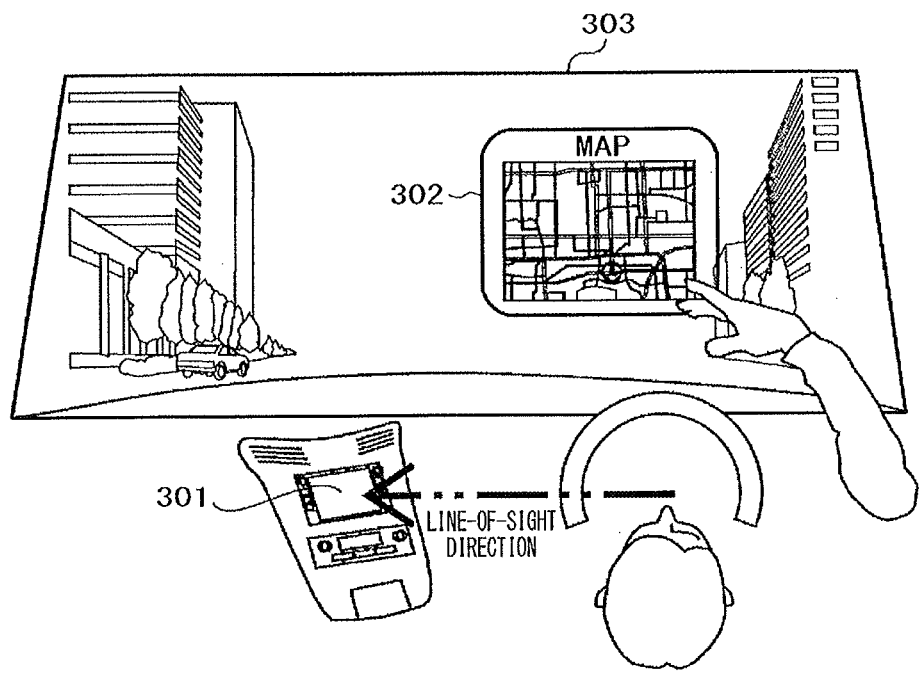
FIG. 3A illustrates a line-of-sight direction of a driver at the time of gesture detection.

Then, the detected motion determining unit 113 determines whether or not the line of sight of the driver faces in a direction other than the direction of the navigation screen 107 based on the line-of-sight direction of the driver calculated by the line-of-sight direction calculating unit 110 and position information of the navigation screen 107 recorded in the device position information recording unit 112 (S202). Specifically, the detected motion determining unit 113 reads 3D coordinates of the head of the driver and 3D coordinates of the navigation screen, and determines whether or not a vector of the detected line-of-sight direction matches a direction in which the head faces the navigation screen. When the line-of-sight direction is determined to be the direction of the navigation screen as illustrated in FIG. 3A (No in S202), the detected motion determining unit 113 determines that the detected motion of the driver is a gesture performed with an intention to operate content displayed on the navigation screen, and transmits content of an operation corresponding to the detected gesture to the in-vehicle device control unit 114. The in-vehicle device control unit 114 performs processing according to a type of the operation received from the gesture detection device 101, and the display content control unit 115 causes display content in which a processing result is reflected to be displayed on the display device 103 (S203).

Figure 3B:
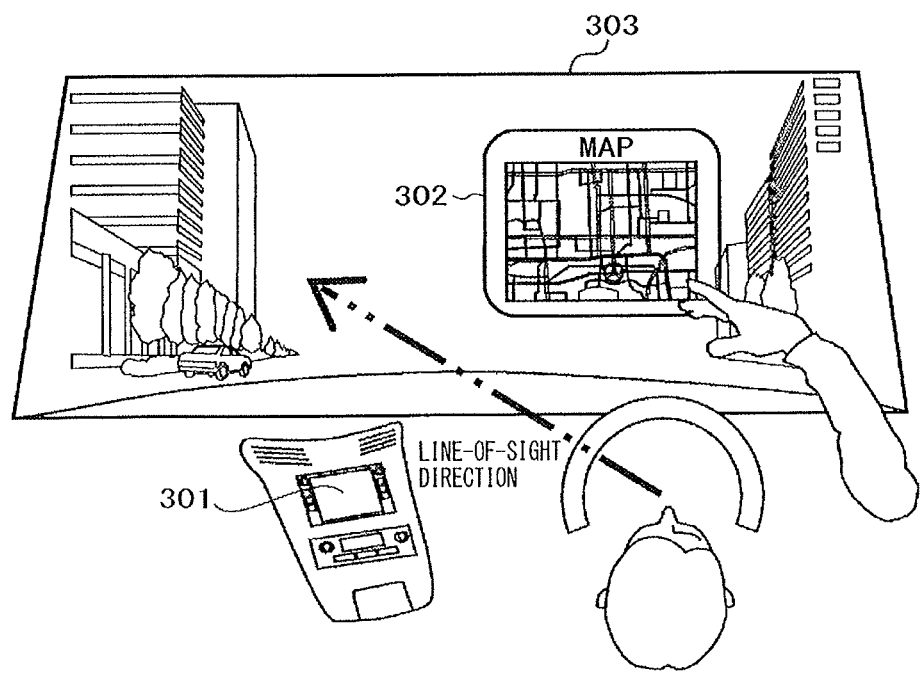
FIG. 3B illustrates a line-of-sight direction of a driver at the time of gesture detection.

On the other hand, when the line-of-sight direction is determined to be not the direction of the navigation screen (Yes in S202), the detected motion determining unit 113 determines whether or not the line of sight of the driver faces the HUD based on the line-of-sight direction of the driver and position information of the HUD 108 recorded in the device position information recording unit 112 (S204). Specifically, the detected motion determining unit 113 reads 3D coordinates of the head of the driver and 3D coordinates of the HUD, and determines whether or not a vector of the detected line-of-sight direction matches a direction in which the head faces the HUD. When the line-of-sight direction is determined to be not the direction of the HUD as illustrated in FIG. 3B (No in S204), the detected motion determining unit 113 determines that the detected motion of the driver is not the motion with an intention to operate the device, and thus dismisses the detected motion result (S205).

Figure 3C:
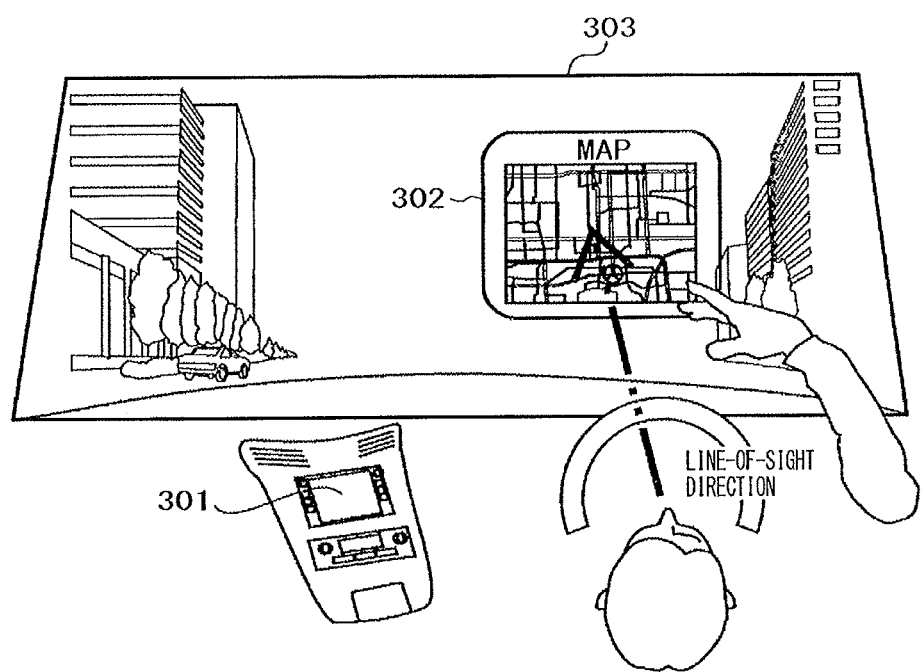
FIG. 3C illustrates a line-of-sight direction of a driver at the time of gesture detection.

On the other hand, when the line-of-sight direction of the driver is determined to be the direction of the HUD as illustrated in FIG. 3C (Yes in S204), the detected motion determining unit 113 determines that the detected motion of the driver is a gesture with an intention to operate content displayed on the HUD, and transmits content of an operation corresponding to the detected gesture to the in-vehicle device control unit 114. The in-vehicle device control unit 114 performs processing according to a type of the operation received from the gesture detection device 101, and the display content control unit 115 causes display content in which a processing result is reflected to be displayed on the display device 103 (S206). Thereafter, when the gesture detection is not continued (Yes in S207), the present process ends.

Figure 1B:
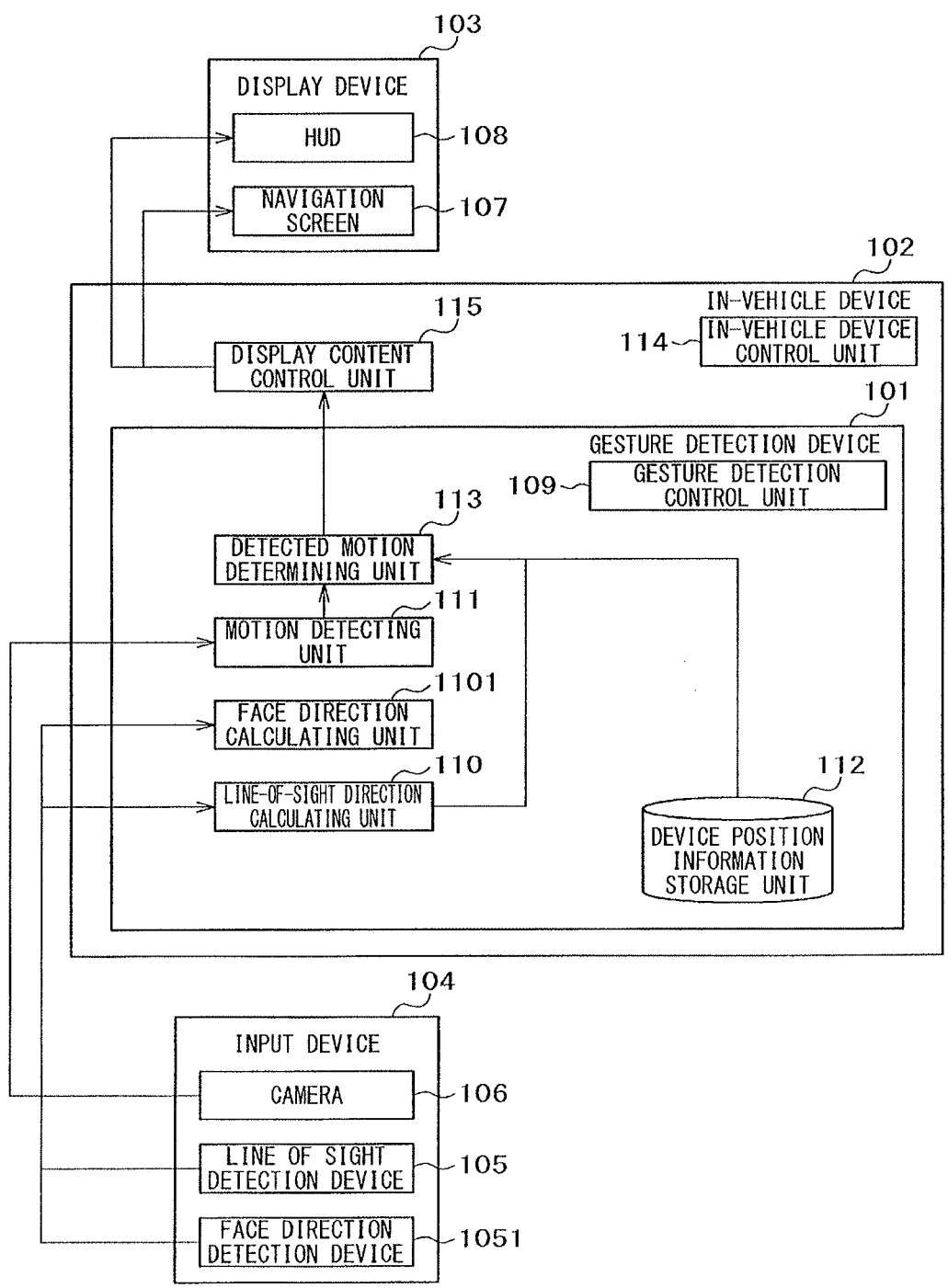
FIG. 1B is a configuration diagram (face direction determination) of an in-vehicle device system according to the first embodiment of the present invention.

In the present configuration, the line of sight detection device 105 that detects the line of sight of the driver and the line-of-sight direction calculating unit 110 are used. However, as illustrated in FIG. 1B, together with or instead of the line of sight detection device 105 and the line-of-sight direction calculating unit 110, a configuration in which information of a face direction is output using a face direction detection device 1051 that detects the face direction of the driver from the input video of the camera 106, and the face direction of the driver is used instead of the line-of-sight direction using a face direction detecting unit 1101 may be used. In this case, a configuration in which the line of sight detection device 105 is omitted can be implemented, and thus the number of parts and the cost can be reduced. Further, as the technique of detecting the face direction of the driver from the input video, various techniques can be used such as a technique in which the face direction detecting unit 1101 extracts features (for example, eyes, a noise, and a mouth) of the face, determines the face direction or a degree thereof according to whether or not the features are symmetric on the center or how the features are asymmetric, or determines the face direction or a degree thereof according to the concentration of shadow in a face image.

Further, in the present configuration, when it is difficult to detect the line of sight of the driver correctly through a series of operations (for example, a situation in which the driver's eyes are covered with her/his hand, sunglasses, or the like other than a situation in which the line-of-sight directions indicated by both eyes are not the same direction but crossed), the detected motion determining unit 113 may dismiss all the motion detection results obtained by the motion detecting unit 111. Thus, even in the situation in which it is difficult to detect the line of sight of the driver correctly, it is possible to prevent the motion performed without intention to operate the device by the driver from being erroneously recognized as the gesture.

Figure 2B:
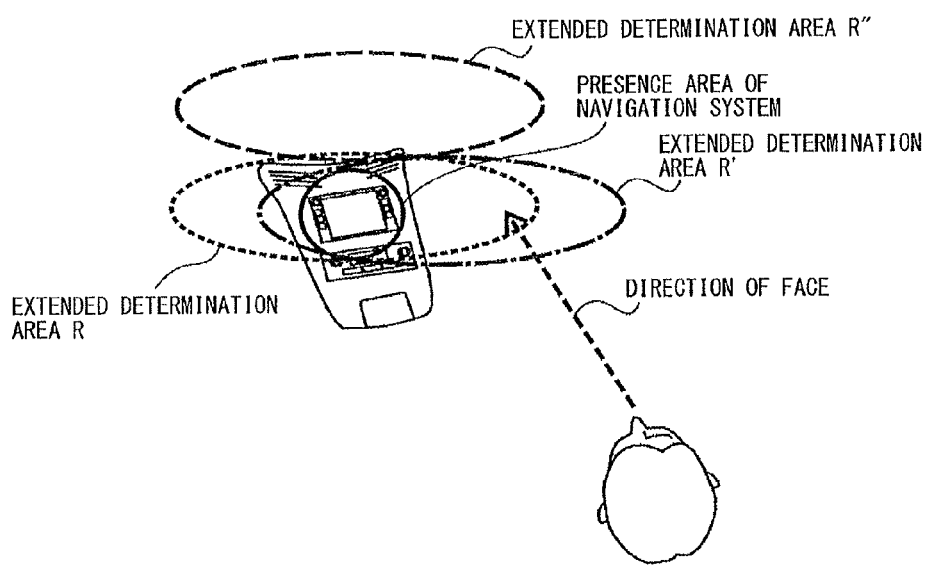
FIG. 2B is a diagram illustrating an example of a determination area obtained by extending a surrounding area including a position at which a navigation system is placed.

Further, when it is difficult to detect the line-of-sight direction correctly, a configuration in which the face direction is used instead of the line-of-sight direction using the face direction detecting unit 1101 may be employed. Specifically, the detected motion determining unit 113 determines whether or not the driver is looking to the direction of the HUD according to whether or not the face direction is toward an area in which the HUD is located, and determines whether or not the driver is looking at the navigation system according to whether or not the face direction of the driver is toward the inside of a determination area R (an extended area) obtained by extending an area in which the navigation system is located in the horizontal direction. Specifically, the detected motion determining unit 113 may set a determination target by using a surrounding area including a position at which the navigation system is placed as an extended determination area as illustrated in FIG. 2B and perform a gesture detection process while considering the case in which it is difficult to detect the line of sight according to a procedure illustrated in FIG. 2C. For example, the area in which the navigation system is located is extended in a traverse direction at a certain rate and set as an area to be determined. The extension rate is decided so that, in general, the direction indicated by the face direction when the user is looking at the navigation system is included in the extended area, and the extended area is set as the determination area. In the gesture detection process illustrated in FIG. 2C, the process of steps S201 to S207 is the same as the process illustrated in FIG. 2A, and thus a description thereof is omitted.

Figure 2C:
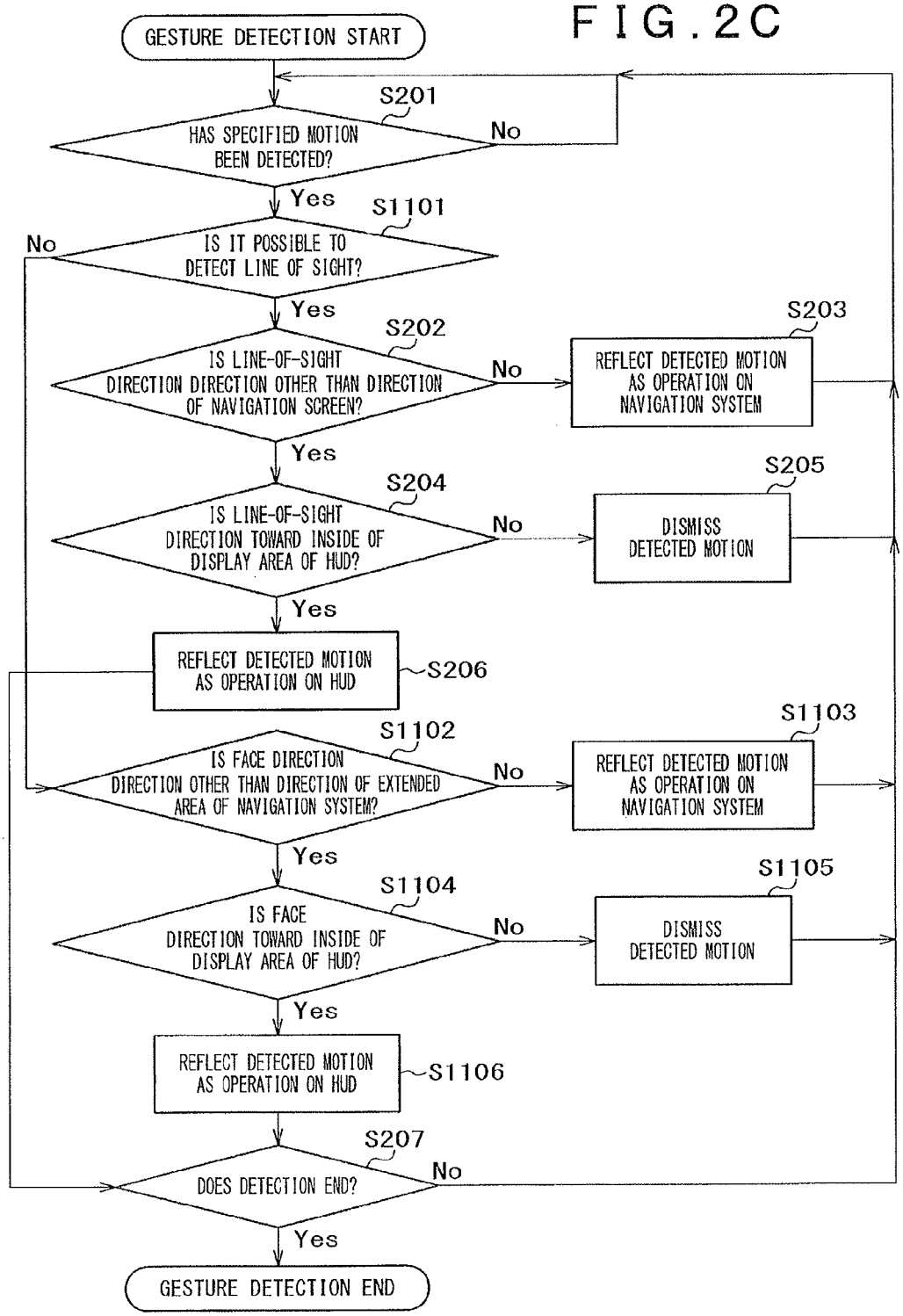
FIG. 2C is an operation flow (face direction determination) at the time of gesture detection according to the first embodiment of the present invention.

As illustrated in FIG. 2C, when the motion detecting unit 111 determines that the specified motion has been detected (Yes in S201), the line-of-sight direction calculating unit 110 determines whether or not it is possible to detect the line of sight of the driver based on the directions of the eyeballs of the driver obtained from the line of sight detection device 105 (S1101).

Then, when the line-of-sight direction calculating unit 110 determines that it is possible to detect the line of sight of the driver (Yes in S1101), the process proceeds to S202, and when the line-of-sight direction calculating unit 110 determines that it is difficult to detect the line of sight of the driver (No in S1101), the detected motion determining unit 113 determines whether or not the face of the driver faces in a direction other than the direction of the extended area based on the face direction of the driver calculated by the face direction calculating unit 1101 and the extended area (S1102). Specifically, the detected motion determining unit 113 reads 3D coordinates of the face of the driver and coordinates of the extended area, and determines whether or not a vector of the detected face direction matches a direction in which the face faces the navigation screen.

Similarly to the determination based on the line-of-sight direction, when the face direction is determined to be the direction of the extended area (No in S1102), the detected motion determining unit 113 determines that the detected motion of the driver is a gesture performed with an intention to operate content displayed on the navigation screen, and then the same process as in S203 is performed (S1103).

Meanwhile, when the face direction is determined to be the direction other than the direction of the navigation screen (Yes in S1102), the detected motion determining unit 113 determines whether or not the face of the driver faces the HUD based on the face direction of the driver and the position information of the HUD 108 recorded in the device position information recording unit 112 (S1104). Specifically, the detected motion determining unit 113 reads the 3D coordinates of the face of the driver and the 3D coordinates of the HUD, and determines whether or not the vector of the detected face direction matches the direction in which the face faces the HUD.

Similarly to the determination based on the line-of-sight direction, when the face direction is determined to be not the direction of the HUD (No in S1104), the detected motion determining unit 113 determines that the detected motion of the driver is not the motion with an intention to operate the device, and then the same process as S205 is performed (S1105).

On the other hand, when the line-of-sight direction of the driver is determined to be the direction of the HUD (Yes in S1104), the detected motion determining unit 113 determines that the detected motion of the driver is a gesture with an intention to operate content displayed on the HUD, and then the same process as S206 is performed (S1106).

As described above, even when it is difficult to detect the line-of-sight direction correctly, it is possible to prevent the motion performed without intention to operate the device by the driver from being erroneously recognized as the gesture, and it is possible to detect the motion intended for an operation as the gesture.

Further, in the present configuration, the position information of the HUD 108 is stored in the device position information recording unit 112. However, when a display position or a display area of the HUD dynamically change, a configuration of sequentially receiving information of the display position and the display area of the HUD from the display content control unit 115 and updating information of the device position information recording unit 112 may be employed. Thus, even when content displayed on the HUD dynamically changes, it is possible to determine whether or not the line of sight of the driver faces the HUD with a high degree of accuracy.

For example, FIG. 2B has been described in connection with the example in which the extended area is the determination area R obtained by extending the area in which the navigation system is located in the horizontal direction. However, the extended area may be set as in R' such that the extended area is shifted to the right side or the left side, for example, according to a relative position between the driver and the navigation system such as a handle position (a right handle or a left handle) or a dominant eye of the driver. Further, when the driver is tall, the extended area may be set to be high as in R", whereas when the driver is short, the extended area may be set to be low. As described above, when the extended area is set according to the relative position between the driver and the navigation system or characteristics of the driver, the erroneous recognition of the device can be reduced, and the driver can perform an operation easily. In addition, the extended area may set for each driver. In this case, even when there are a plurality of drivers (for example, when the vehicle is shared), the extended area can be set for each driver.

Further, when the line of sight has not been detected in S1101 in FIG. 2C (No in S1101), the detected motion determining unit 113 may count the number of non-detection, and perform the process of S1101 to S1106 first when the number of non-detection reaches a certain number of times within a certain period of time or when the number of non-detection reaches a certain number of times consecutively. In this case, since the face direction is determined without performing the process in which the line-of-sight direction is unlikely to be detected, the process until the gesture is detected can be shortened.

Further, the present configuration has been described in connection with the example in which the display device 103 includes the HUD 108 and the navigation screen 107, and the input device 104 includes the line of sight detection device 105, the face detection device 1051, and the camera 106. However, this configuration need not be necessarily employed, and the configuration may be appropriately changed, for example, such that the line of sight detection device 105 or the face detection device 1051 is installed in the in-vehicle device 102. In other words, the present system can be configured in various forms as long as the gesture detection device 401 can acquire information used to detect the line-of-sight direction or the face direction.

As described above, when the specified motion of the driver is detected, it is determined whether or not the detected motion is the motion with an intention to operate the device based on the line-of-sight direction of the driver. Thus, it is possible to provide the gesture detection device that detects only the gesture performed in the vehicle with an intention to operate the device by the driver but does not detect the other motions (for example, the hand gesture toward the outside the vehicle) as the gesture to operate the device, and it is possible to implement an intuitive operation on the in-vehicle device in the vehicle, a reduction in time and error of an operation, and a seamless quick operation.

Further, the gesture detection device described in the present embodiment is not limited to an operation on content displayed on the navigation screen and the HUD and can be applied to any other device such as an air conditioner or an audio device or content displayed on a meter panel as well. Moreover, the gesture detection device is not limited to the form in which it is mounted in the in-vehicle device, and the gesture detection device may be mounted in a device in which display content or a status of a device can be operated by a gesture such as a digital signage, an interaction white board, or a television. In this case, by applying the present invention, it is possible to prevent a situation in which a motion performed without intention to operate the device by the user is erroneously recognized as the gesture.

Second Embodiment

In the first embodiment, the line-of-sight direction or the face direction of the driver is detected, and it is determined whether or not a detected motion is a gesture with an intention to operate content displayed on the navigation screen or the HUD. However, even when the line-of-sight direction or the face direction of the driver is not toward the navigation screen or the HUD, there are cases in which an operation is performed while looking in the direction of the virtual image of the HUD. In this regard, for preparation of this case, a gesture detection process when the driver performs an operation while looking in the direction of the virtual image of the HUD will be described below.

Figure 4A:
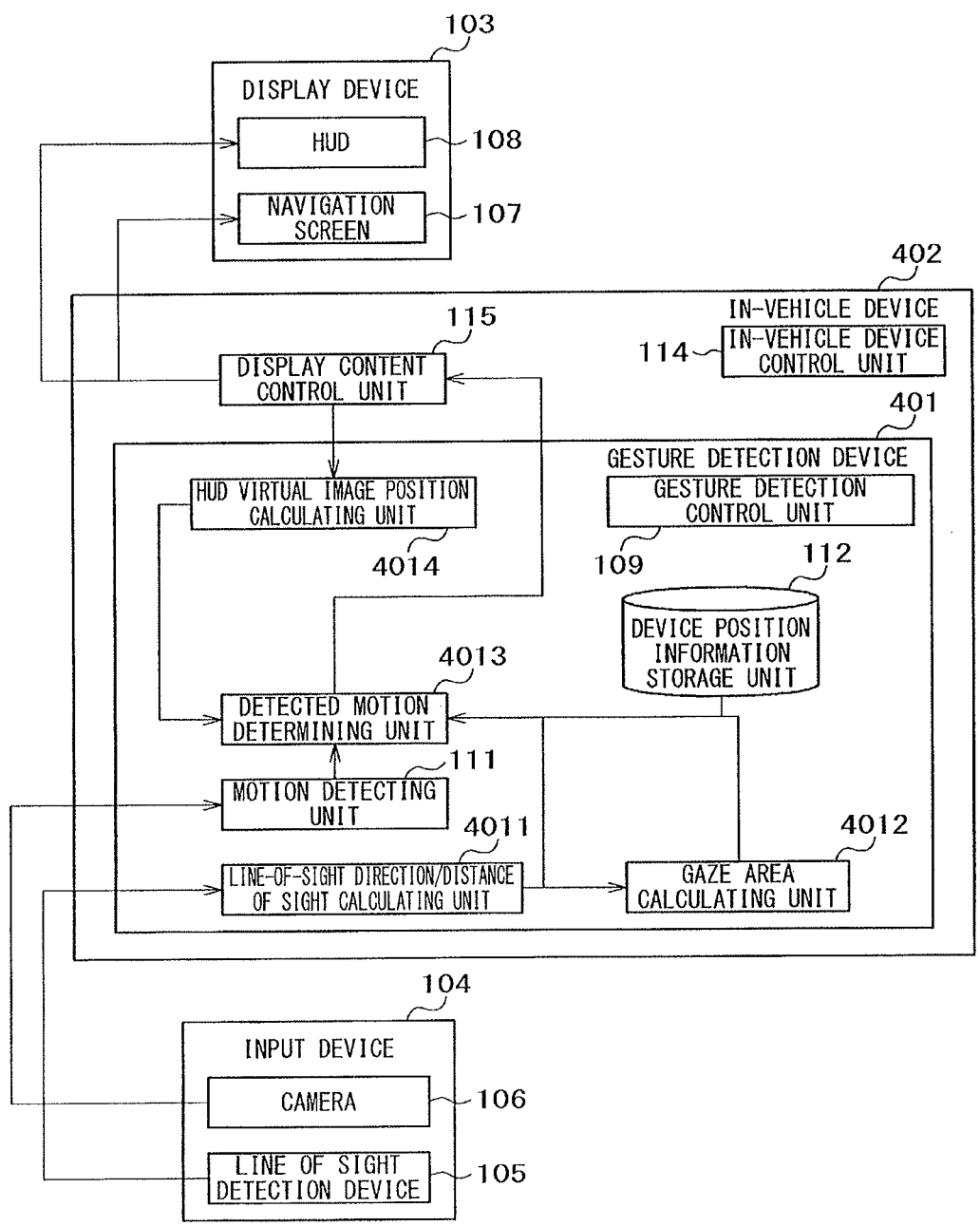
FIG. 4A is a configuration diagram of an in-vehicle device system according to a second embodiment of the present invention.

FIG. 4A is a configuration diagram of an in-vehicle device system equipped with a gesture detection device 401 according to the present embodiment. The present in-vehicle device system includes an in-vehicle device 402 including the gesture detection device 401, a display device 103, and an input device 104. The in-vehicle device 402 includes a gesture detection device 401, an in-vehicle device control unit 114, and a display content control unit 115, and the gesture detection device 401 differs from the gesture detection device 101 of the first embodiment in that a line-of-sight direction/distance of sight calculating unit 4011, a gaze area calculating unit 4012, a detected motion determining unit 4013 different from that of the first embodiment, and a HUD virtual image position calculating unit 4011 are provided. Hereinafter, the same components as those of the first embodiment are denoted by the same reference numerals, and a description thereof is omitted.

Figure 4B:
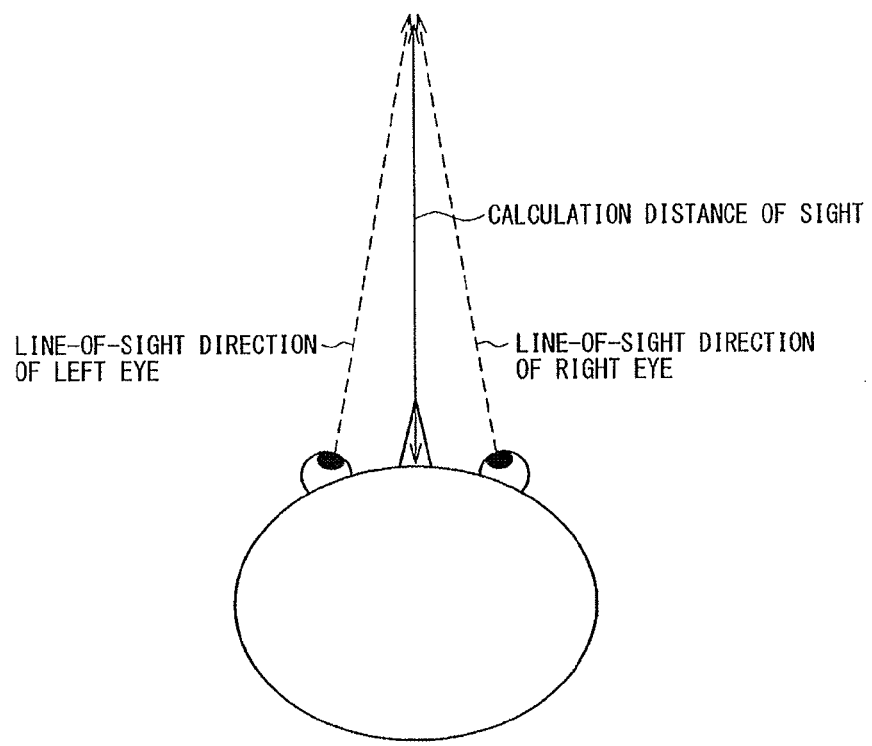
FIG. 4B is a diagram illustrating an example of calculating a distance of sight of a driver from a cross point of line-of-sight directions of left and right eyes.

The line-of-sight direction/distance of sight calculating unit 4011 calculates a direction in which the line of sight of the driver faces in the vehicle based on the direction information of the left and right eyeballs obtained from the line of sight detection device 105, and calculates a distance of sight of the driver from a crossing point of the line-of-sight directions of the left and right eyes as illustrated in FIG. 4B. The gaze area calculating unit 4012 calculates 3D space coordinates of an area at which the driver gazes based on the line-of-sight direction and the distance of sight of the driver obtained from the line-of-sight direction/distance of sight calculating unit 4011.

The detected motion determining unit 4013 performs the same process as the process of the first embodiment, and further receives information from the motion detecting unit 111, the line-of-sight direction/distance of sight calculating unit 4011, the gaze area calculating unit 4012, the HUD virtual image position calculating unit 4014, and the device position information recording unit 112 as input information, and determines whether or not the motion of the driver detected by the motion detecting unit 111 is the motion performed with an intention to operate the device. The HUD virtual image position calculating unit 4014 calculates 3D coordinates of an area in which a virtual image of content displayed on the HUD 108 is displayed based on information obtained from the display content control unit 409.

Figure 5A:
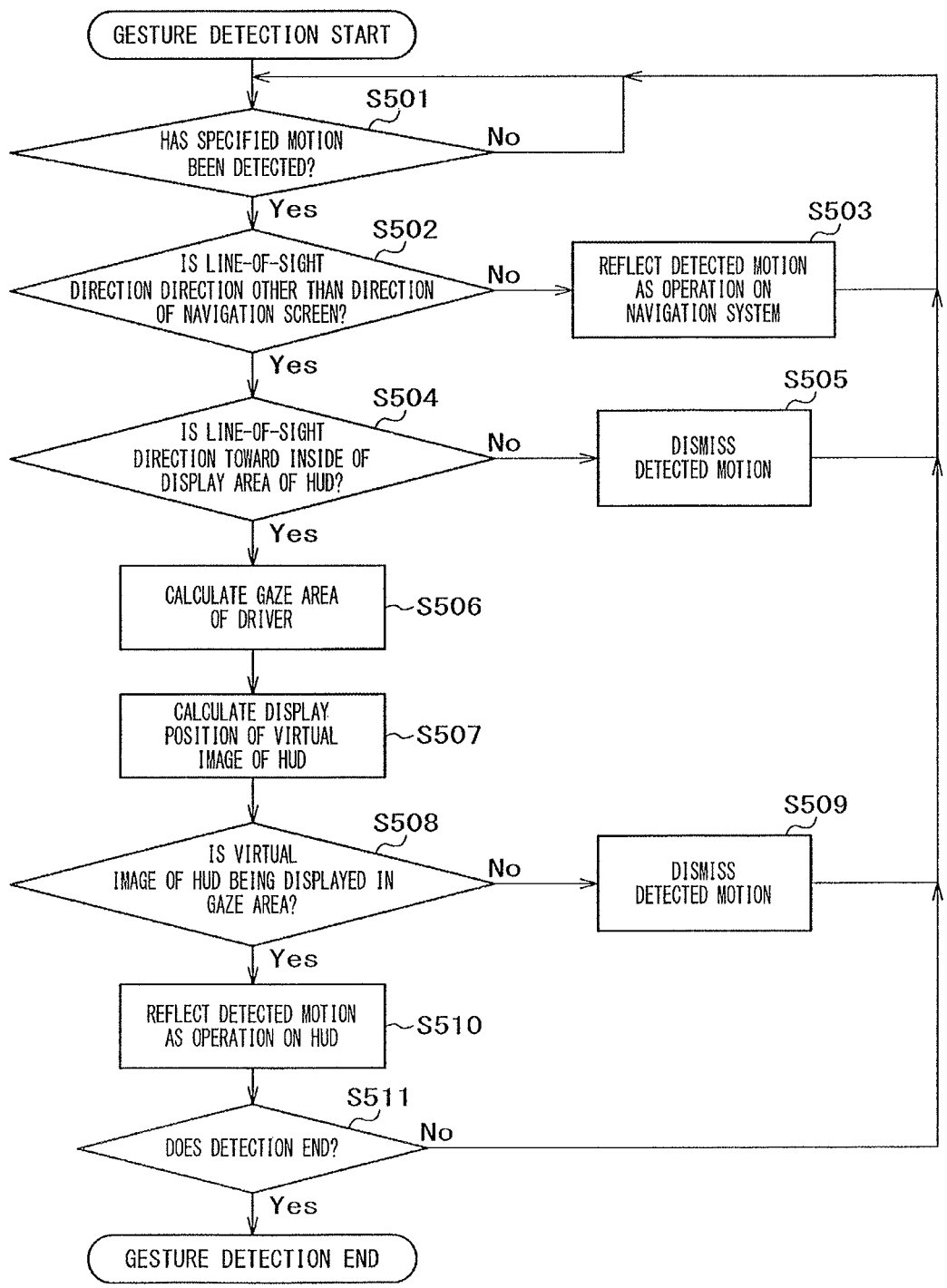
FIG. 5A is an operation flow (line-of-sight direction) at the time of gesture detection according to the second embodiment of the present invention.

A processing procedure of a gesture detection process according to the present embodiment will be described in detail with reference to an operation flow of FIG. 5A.

First, the driver gesture detection starts, for example, when the in-vehicle device is powered on. The motion detecting unit 111 determines whether or not the driver has performed a previously specified motion (a motion registered as a gesture to operate the device) based on an input video of the camera 106 (S501), and performs the detection continuously when the specified motion is determined to have been not detected (No in S501). On the other hand, when the motion detecting unit 111 determines that the specified motion has been detected (Yes in S501), the line-of-sight direction/distance of sight calculating unit 4011 calculates the line-of-sight direction and the distance of sight of the driver when the gesture is detected based on the directions of the eyeballs of the driver obtained from the line of sight detection device 105.

Then, the detected motion determining unit 4013 determines whether or not the line of sight of the driver faces in a direction other than the direction of the navigation screen 107 based on the line-of-sight direction of the driver calculated by the line-of-sight direction/distance of sight calculating unit 4011 and the position information of the navigation screen 107 recorded in the device position information recording unit 112 (S502), similarly to the first embodiment. When the line-of-sight direction is determined to be the direction of the navigation screen (No in S502), the detected motion determining unit 4013 determines that the detected motion of the driver is a gesture performed with an intention to operate content displayed on the navigation screen, and transmits content of an operation corresponding to the detected gesture to the in-vehicle device control unit 114, and thereafter, the same process as in the first embodiment is performed (S503).

On the other hand, when the line-of-sight direction is determined to be not the direction of the navigation screen (Yes in S502), the detected motion determining unit 4013 determines whether or not the line of sight of the driver faces the HUD based on the line-of-sight direction of the driver and the position information of the HUD 108 recorded in the device position information recording unit 112 (S504), similarly to the first embodiment. When the line-of-sight direction is determined to be not the direction of the HUD (No in S504), the detected motion determining unit 4013 determines that the detected motion of the driver is not the motion with an intention to operate the device, and the same process as in the first embodiment is performed (S505).

On the other hand, similarly to the first embodiment, when the detected motion determining unit 4013 determines that the line-of-sight direction of the driver is the direction of the HUD (Yes in S504), the gaze area calculating unit 405 calculates 3D coordinates of an area at which the driver gazes based on the information obtained from the line-of-sight direction/distance of sight calculating unit 4011 (S506). Further, the HUD virtual image position calculating unit 406 calculates 3D coordinates of the virtual image based on the information obtained from the display content control unit 409 as the position of the virtual image of content displayed on the HUD (S507).

Figure 6A:
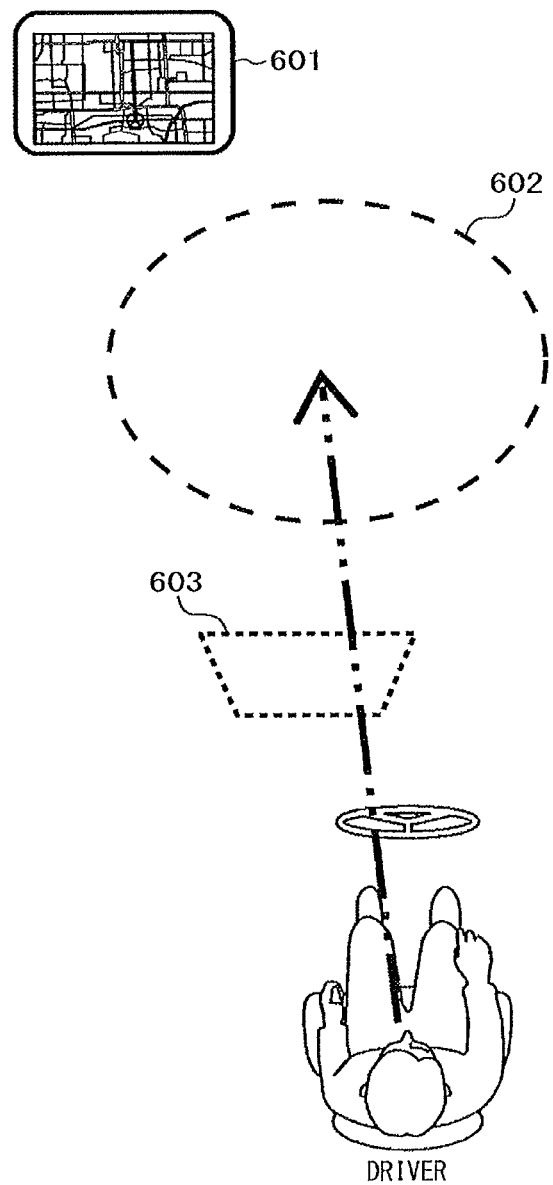
FIG. 6A illustrates a relation between a gaze area of a driver and an HUD virtual image position.

Then, the detected motion determining unit 4013 determines whether or not the virtual image of the HU is included in the gaze area of the driver (S508). When a HUD virtual image 601 displayed on a display area 603 is determined to be not included in a gaze area 602 of the driver as illustrated in FIG. 6A (No in S508), the detected motion determining unit 4013 determines that the detected motion of the driver is not the motion with an intention to operate the device, and dismisses the detected motion result (S509).

Figure 6B:
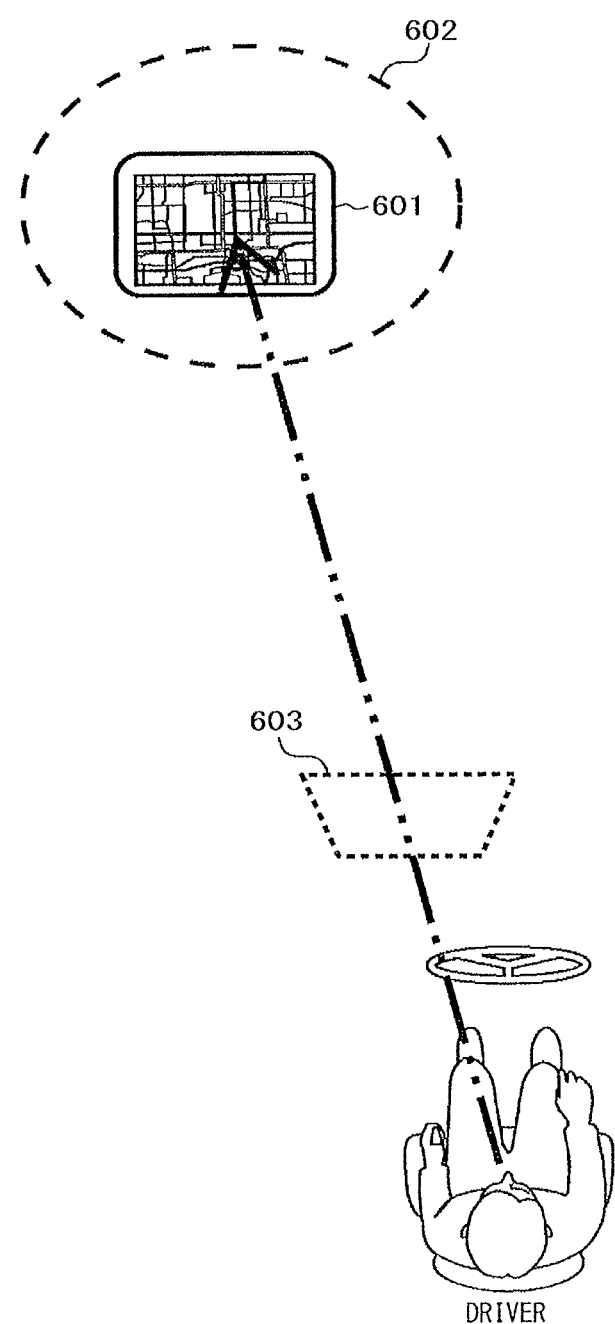
FIG. 6B illustrates a relation between a gaze area of a driver and an HUD virtual image position.

On the other hand, when the virtual image of the HUD is determined to be included in the gaze area of the driver as illustrated in FIG. 6B (Yes in S508), the detected motion determining unit 4013 determines that the detected motion of the driver is a gesture with an intention to operate content displayed on the HUD, and transmits content of an operation corresponding to the detected gesture to the in-vehicle device control unit 408, and the same process as in the first embodiment is performed (S510). Thereafter, when the gesture detection is not continued (Yes in S511), the present process ends.

In the present configuration, the line of sight detection device 105 and the line-of-sight direction/distance of sight detecting unit 4011 that detect the line of sight of the driver and the distance of sight are used. However, similarly to the first embodiment, together with or instead of the line of sight detection device 105 and the line-of-sight direction/distance of sight detecting unit 4011, a configuration in which the face direction of the driver is used instead of the line-of-sight direction using the face direction detection device 1051 that detects the face direction of the driver from the input video of the camera 106 or the face direction calculating unit 1101 may be used. In this case, the determination process in S508 is performed by determining whether or not the virtual image of the HUD is being displayed in the front in the face direction. Thus, a configuration in which the line of sight detection device 105 is omitted can be implemented, and thus the number of parts and the cost can be reduced.

Figure 5B:
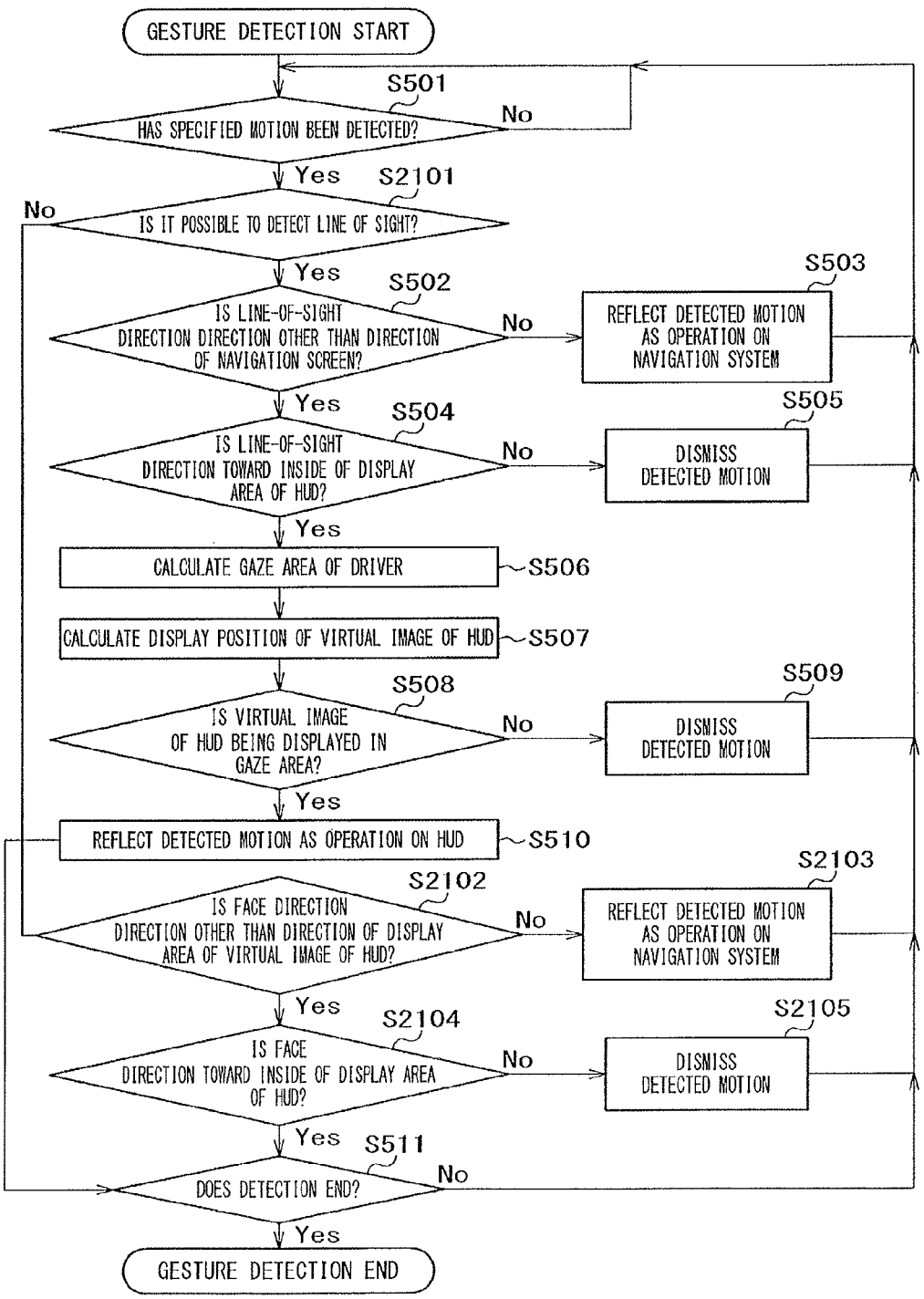
FIG. 5B is an operation flow (face direction) at the time of gesture detection according to the second embodiment of the present invention.

For example, as illustrated in FIG. 5B, similarly to the first embodiment, when the motion detecting unit 111 determines that the specified motion has been detected (Yes in S501), the line-of-sight direction/distance of sight detecting unit 4011 determines whether or not it is possible to detect the line of sight of the driver based on the directions of the eyeballs of the driver obtained from the line of sight detection device 105 (S2101).

Then, when the line-of-sight direction/distance of sight detecting unit 4011 determines that it is possible to detect the line of sight of the driver (Yes in S2101), the process proceeds to S502. On the other hand, when it is determined that it is difficult to detect the line of sight of the driver (No in S2101), the detected motion determining unit 4013 determines whether or not the face of the driver faces in a direction other than the direction of the display area based on the face direction of the driver calculated by the face direction calculating unit 1101 illustrated in FIG. 1B and the display area of the virtual image of the HUD (S2102). Specifically, the detected motion determining unit 4013 reads 3D coordinates of the face of the driver and coordinates of the display area, and determines whether or not the vector of the detected face direction matches the direction from the face to the HUD.

Similarly to the determination based on the line-of-sight direction, when the face direction is determined to be the direction of the display area (No in S2102), the detected motion determining unit 4013 determines that the detected motion of the driver is a gesture with an intention to operate content displayed on the HUD, and then the same process as S503 is performed (S2103).

On the other hand, similarly to the first embodiment, when the face direction is determined to be not the direction of the display area of the virtual image of the HUD (Yes in S2102), the detected motion determining unit 4013 determines whether or not the face of the driver faces the HUD based on the face direction of the driver and the position information of the HUD 108 recorded in the device position information recording unit 112 (S2104). When the face direction is determined to be not the direction of the HUD (No in S2104), the detected motion determining unit 4013 determines that the detected motion of the driver is not the motion with an intention to operate the device, and then the same process as S505 is performed (S2105).

On the other hand, when the line-of-sight direction of the driver is determined to be the direction of the HUD (Yes in S2104), the detected motion determining unit 4013 determines that the detected motion of the driver is a gesture with an intention to operate content displayed on the HUD, and then, similarly to the first embodiment, the process proceeds to S510 and S511.

As described above, in the second embodiment, even when it is difficult to detect the line-of-sight direction correctly, it is possible to prevent the motion performed without intention to operate the device by the driver from being erroneously recognized as the gesture, and it is possible to detect the motion intended for an operation as the gesture.

Further, similarly to the first embodiment, the display area of the virtual image of the HUD may be set such that the display area of the virtual image of the HUD is shifted to the right side or the left side, for example, according to the relative position between the driver and the navigation system such as a handle position (a right handle or a left handle) or a dominant eye of the driver. Moreover, when the driver is tall, the display area of the virtual image of the HUD may be set to be high, whereas when the driver is short, the display area of the virtual image of the HUD may be set to be low. The display area of the virtual image of the HUD may be set for each driver.

Further, similarly to the first embodiment, when the line of sight has not been detected in S2101 in FIG. 5B (No in S1101), the detected motion determining unit 4013 may count the number of non-detection, and perform the process of S2101 to S2105 first when the number of non-detection reaches a certain number of times within a certain period of time or when the number of non-detection reaches a certain number of times consecutively.

Further, in the present configuration, when it is difficult to detect the line of sight of the driver correctly through a series of operations (for example, a situation in which the driver's eyes are covered with her/his hand, sunglasses, or the like other than a situation in which the line-of-sight directions indicated by both eyes are not the same direction but crossed), similarly to the first embodiment, the detected motion determining unit 4013 may dismiss all the motion detection results obtained by the motion detecting unit 111, and when it is difficult to detect the line-of-sight direction correctly, the face direction may be used instead of the line-of-sight direction using the face direction detecting unit.

Further, in the present configuration, the position information of the HUD 108 is stored in the device position information recording unit 112. However, similarly to the first embodiment, when a display position or a display area of the HUD dynamically change, a configuration of sequentially receiving information of the display position and the display area of the HUD from the display content control unit 115 and updating information of the device position information recording unit 112 may be employed.

Further, the present configuration has been described in connection with the example in which the display device 103 includes the HUD 108 and the navigation screen 107, and the input device 104 includes the line of sight detection device 105, the face detection device 1051, and the camera 106. However, similarly to the first embodiment, the present system can be configured in various forms as long as the gesture detection device 401 can acquire information used to detect the line-of-sight direction or the face direction.

As described above, when the specified motion of the driver is detected, it is determined whether or not the detected motion is the motion with an intention to operate the device based on the line-of-sight direction or the gaze area of the driver and the display position of the virtual image of the HUD. Thus, similarly to the first embodiment, it is possible to provide the gesture detection device that detects only the gesture performed in the vehicle with an intention to operate the device by the driver but does not detect the other motions (for example, the hand gesture toward the outside the vehicle) as the gesture to operate the device, and it is possible to implement an intuitive operation on the in-vehicle device in the vehicle, a reduction in time and error of an operation, and a seamless quick operation.

Further, the gesture detection device described in the present embodiment is not limited to an operation on content displayed on the navigation screen and the HUD and can be applied to any other device such as an air conditioner or an audio device or content displayed on a meter panel as well, similarly to the first embodiment.

Third Embodiment

In the first and second embodiments, the line-of-sight direction or the face direction of the driver is detected regardless of a situation outside the vehicle, and it is determined whether or not a detected motion is a gesture with an intention to operate content displayed on the navigation screen or the HUD. However, practically, the driver is often influenced by a situation outside the vehicle such as a motion of a person or other vehicles. In this regard, for preparation of this case, a gesture detection process when the driver is influenced by a situation outside the vehicle will be described below.

Figure 7:
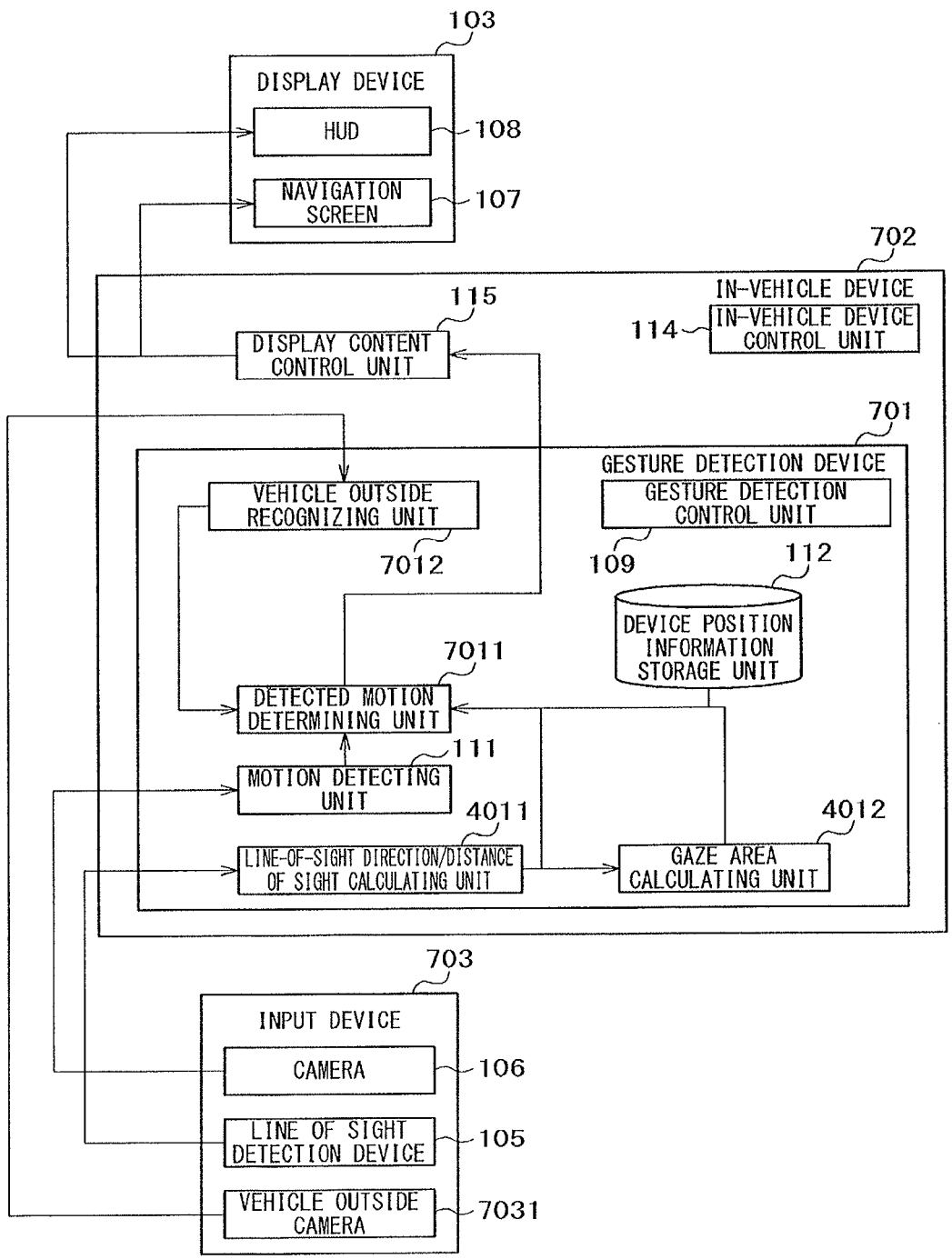
FIG. 7 is a configuration diagram of an in-vehicle device system according to a third embodiment of the present invention.

FIG. 7 is a configuration diagram of an in-vehicle device system equipped with a gesture detection device 701 according to the present embodiment. The present in-vehicle device system is configured with an in-vehicle device 702 including the gesture detection device 701, a display device 103, and an input device 703. The in-vehicle device 702 includes a gesture detection device 701, an in-vehicle device control unit 114, and a display content control unit 115, and the gesture detection device 701 differs from the gesture detection device 401 of the second embodiment in that a detected motion determining unit 7011 different from that of the second embodiment and a vehicle outside recognizing unit (a moving object position calculating unit) 7012 are provided. The input device 703 differs from the input device 104 of the second embodiment in that the input device 703 is equipped with a vehicle outside camera 7031. Hereinafter, the same components as in the second embodiment are denoted by the same reference numerals, and thus a description thereof is omitted.

The detected motion determining unit 7011 receives information of the motion detecting unit 111, the line-of-sight direction/distance of sight calculating unit 4011, the gaze area calculating unit 4012, the vehicle outside recognizing unit 7012, and the device position information recording unit 112 as input information, and determines whether or not the motion of the driver detected by the motion detecting unit 111 is the motion performed with an intention to operate the device.

The vehicle outside recognizing unit 7012 recognizes whether there is a moving object such as a pedestrian or another vehicle outside the vehicle from a vehicle outside video obtained from the vehicle outside camera 7031, and calculates 3D coordinates of a detected object. For example, video data of an object serving as a recognition target is held in advance, and, for example, a pattern matching process of determining whether or not there is a matching object in input video. In the present embodiment, a pedestrian or another vehicle is described as an example of the moving object, and the moving object is assumed to include other moving objects such as a bicycle or a motor cycle.

Figure 8A:
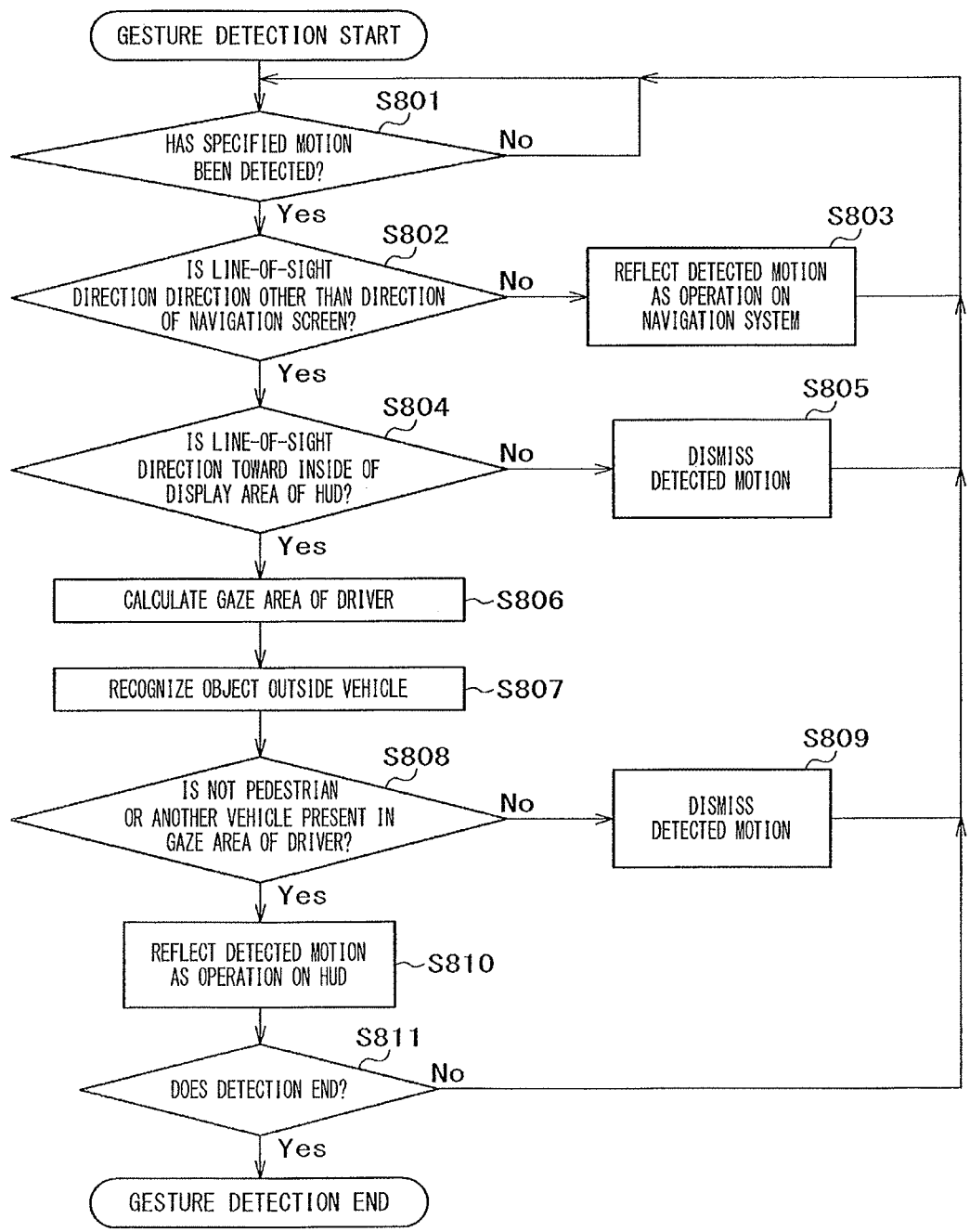
FIG. 8A is an operation flow (line-of-sight direction) at the time of gesture detection according to the third embodiment of the present invention.

A processing procedure of a gesture detection process according to the present embodiment will be described in detail with reference to an operation flow of FIG. 8A.

First, the driver gesture detection starts, for example, when the in-vehicle device is powered on. The motion detecting unit 111 determines whether or not the driver has performed a previously specified motion (a motion registered as a gesture to operate the device) based on an input video of the camera 106 (S801), and performs the detection continuously when the specified motion is determined to have been not detected (No in S801). On the other hand, when the motion detecting unit 111 determines that the specified motion has been detected (Yes in S801), the line-of-sight direction/distance of sight calculating unit 4011 calculates the line-of-sight direction and the distance of sight of the driver when the gesture is detected based on the directions of the eyeballs of the driver obtained from the line of sight detection device 105.

Then, the detected motion determining unit 7011 determines whether or not the line of sight of the driver faces the navigation screen 107 based on the line-of-sight direction of the driver calculated by the line-of-sight direction/distance of sight calculating unit 4011 and the position information of the navigation screen 107 recorded in the device position information recording unit 112 (S802), similarly to the second embodiment. When the line-of-sight direction is determined to face the navigation screen (No in S802), the detected motion determining unit 7011 determines that the detected motion of the driver is a gesture performed with an intention to operate content displayed on the navigation screen, and transmits content of an operation corresponding to the detected gesture to the in-vehicle device control unit 709, and thereafter, the same process as in the second embodiment is performed (S803).

On the other hand, when the line-of-sight direction is not the direction of the navigation screen (Yes in S802), the detected motion determining unit 7011 determines whether or not the line of sight of the driver faces the HUD based on the line-of-sight direction of the driver and the position information of the HUD 108 recorded in the device position information recording unit 112, similarly to the second embodiment (S804). When the detected motion determining unit 7011 determines that the line-of-sight direction is determined to be not the direction of the HUD (No in S804), the detected motion determining unit 7011 determines that the detected motion of the driver is not the motion with an intention to operate the device, and the same process as in the first embodiment is performed (S805).

On the other hand, similarly to the second embodiment, when the detected motion determining unit 7011 determines that the line-of-sight direction of the driver is determined to be the direction of the HUD (Yes in S804), the gaze area calculating unit 405 calculates 3D coordinates of an area at which the driver gazes based on the information obtained from the line-of-sight direction/distance of sight calculating unit 4011 (S806). Further, the vehicle outside recognizing unit 7012 recognizes whether there is a moving object such as a pedestrian or another vehicle outside the vehicle from a video obtained from the vehicle outside camera 7031, and calculates 3D coordinates of a position of a detected object (S807).

Then, the detected motion determining unit 7011 determines whether or not the moving object such as the pedestrian or another vehicle is included in the gaze area of the driver (S808). When the moving object such as the pedestrian or another vehicle is determined to be included in a gaze area 903 of the driver as illustrated in FIG. 9A (No in S808), the detected motion determining unit 7011 determines that the detected motion of the driver is not the motion with an intention to operate the device, and dismisses the detected motion result (S809).

Figure 9B:
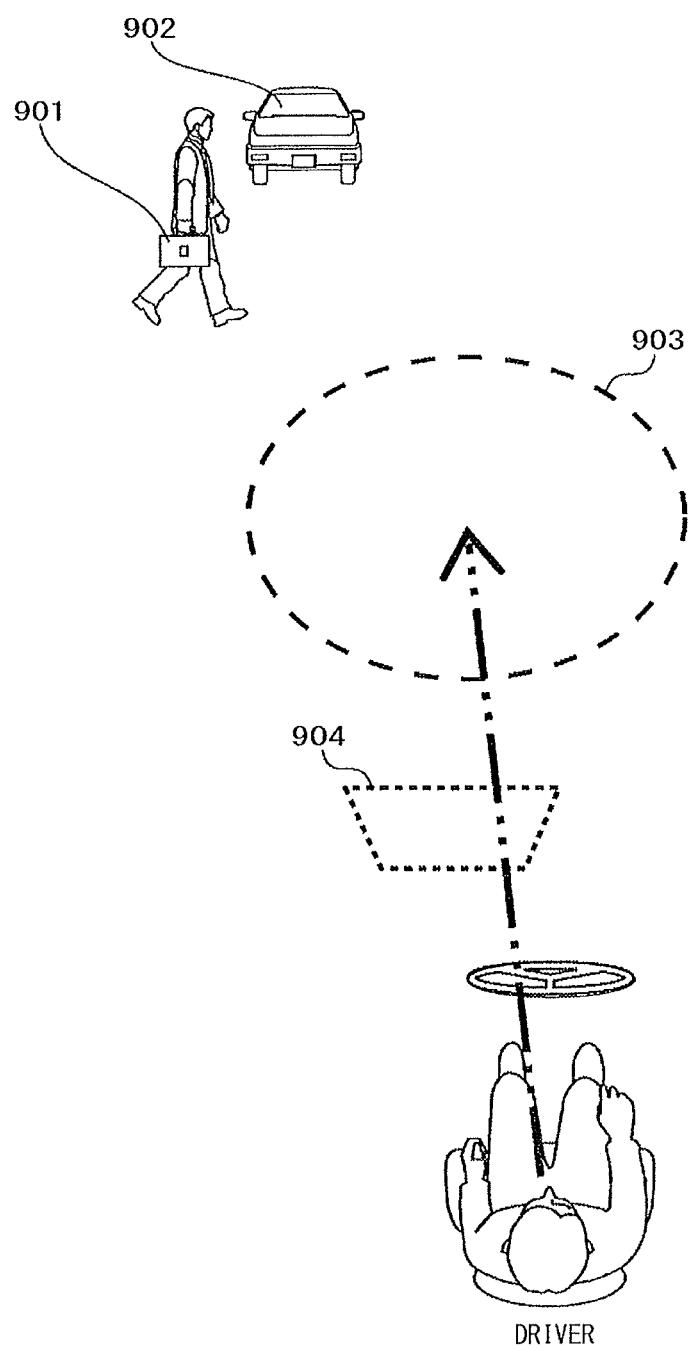
FIG. 9B illustrates a positional relation between a gaze area of a driver and a pedestrian or another vehicle.

On the other hand, when the moving object such as the pedestrian or another vehicle is determined to be not included in the gaze area of the driver as illustrated in FIG. 9B (Yes in S808), the detected motion determining unit 7011 determines that the detected motion of the driver is a gesture with an intention to operate content displayed on the HUD, and transmits content of an operation corresponding to the detected gesture to the in-vehicle device control unit 709, and the same process as in the second embodiment is performed (S810). Thereafter, when the gesture detection is not continued (Yes in S811), the present process ends.

In the present configuration, it is determined whether or not the moving object such as the pedestrian or another vehicle outside the vehicle is included in the gaze area of the driver. Instead, however, it may be determined whether or not there is the moving object such as the pedestrian or another vehicle in front of the line-of-sight direction of the driver without calculating the gaze area. Thus, it is unnecessary to calculate the gaze area of the driver, and it is possible to determine the detected motion even when it is difficult to acquire the gaze area correctly.

Further, in the present configuration, the line of sight detection device 105 and the line-of-sight direction/distance of sight detecting unit 4011 that detect the line of sight of the driver and the distance of sight are used. However, together with or instead of the line of sight detection device 105 and the line-of-sight direction/distance of sight detecting unit 4011, the face direction of the driver may be used instead of the line-of-sight direction using the face direction detection device 1051 or the face direction calculating unit 1101 that detects the face direction of the driver from the input video of the camera 106, similarly to the second embodiment. In this case, the determination process of S808 is performed such that it is determined whether or not there is the moving object such as the pedestrian or another vehicle in the front in the face direction. Thus, a configuration in which the line of sight detection device 105 is omitted can be implemented, and thus the number of parts and the cost can be reduced.

Figure 8B:
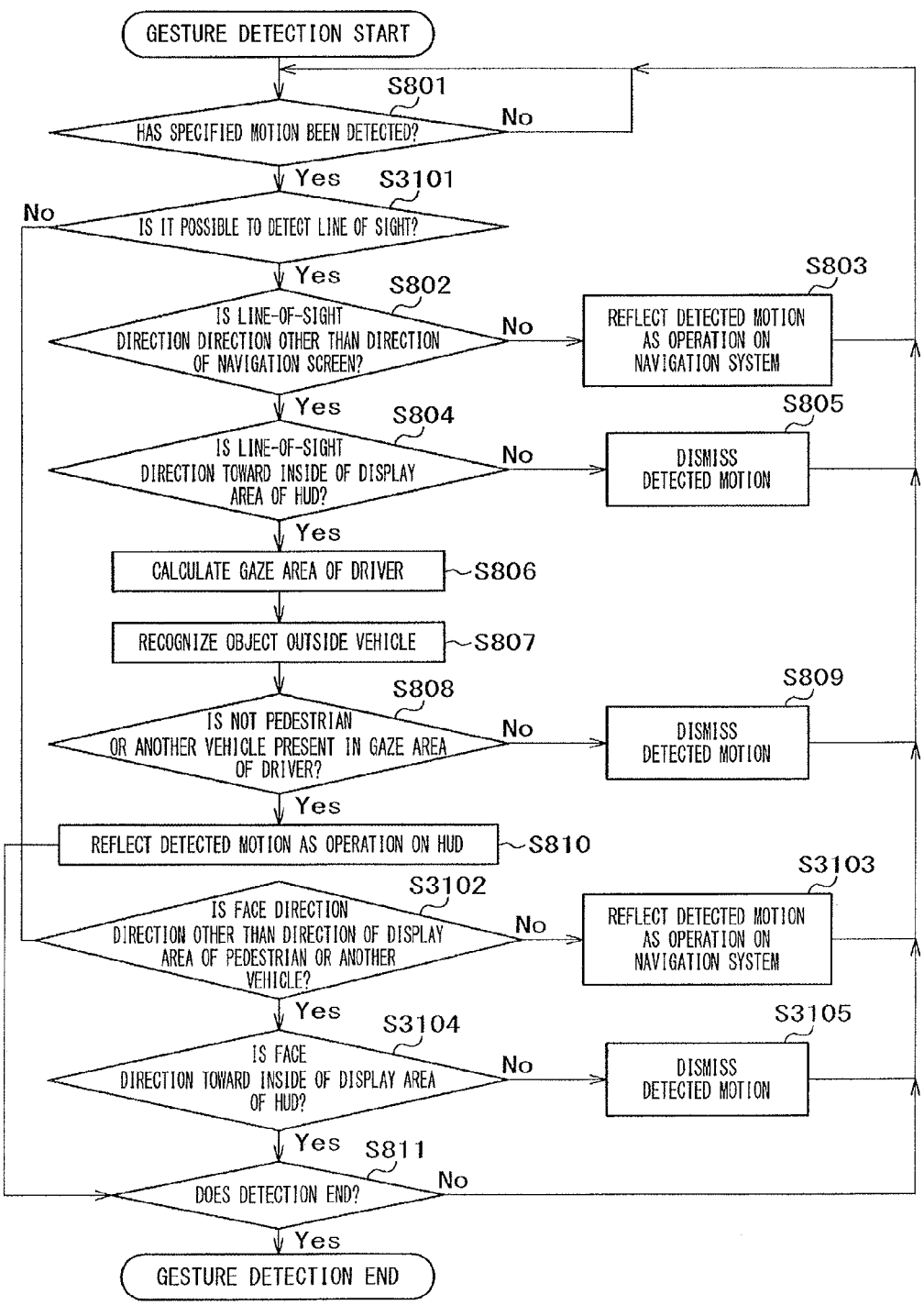
FIG. 8B is an operation flow (face direction) at the time of gesture detection according to the third embodiment of the present invention.

For example, as illustrated in FIG. 8B, similarly to the second embodiment, when the motion detecting unit 111 determines that the specified motion has been detected (Yes in S801), and the line-of-sight direction/distance of sight detecting unit 4011 determines whether or not it is possible to detect the line of sight of the driver based on the directions of the eyeballs of the driver obtained from the line of sight detection device 105 (S3101).

Then, when the line-of-sight direction/distance of sight detecting unit 4011 determines that it is difficult to detect the line of sight of the driver (Yes in S3101), the process proceeds to S802. On the other hand, when it is difficult to detect the line of sight of the driver (No in S3101), the detected motion determining unit 7011 determines whether or not the face of the driver faces in a direction other than the direction of the display area based on the face direction of the driver calculated by the face direction calculating unit 1101 illustrated in FIG. 1B and a display area of the moving object such as the pedestrian or another vehicle outside the vehicle (S3102). Specifically, the detected motion determining unit 7011 reads 3D coordinates of the face of the driver and coordinates of the display area, and determines whether or not the vector of the detected face direction matches a direction in which the face faces the moving object such as the pedestrian or another vehicle outside the vehicle.

Similarly to the determination based on the line-of-sight direction, when the face direction is determined to be the direction of the display area (No in S3102), the detected motion determining unit 7011 determines that the detected motion of the driver is a gesture with an intention to operate content displayed on the HUD, and thereafter, the same process as S803 is performed (S3103).

On the other hand, similarly to the second embodiment, when the face direction is determined to be not the direction of the display area of the moving object such as the pedestrian or another vehicle outside the vehicle (Yes in S3102), the detected motion determining unit 7011 determines whether or not the face of the driver faces the HUD based on the face direction of the driver and the position information of the HUD 108 recorded in the device position information recording unit 112 (S3104). When the face direction is determined to be not the direction of the HUD (No in S3104), it is determined that the detected motion of the driver is not the motion with an intention to operate the device, and thereafter, the same process as S805 is performed (S3105).

On the other hand, when the line-of-sight direction of the driver is determined to be the direction of the HUD (Yes in S3104), the detected motion determining unit 7011 determines that the detected motion of the driver is a gesture with an intention to operate content displayed on the HUD, and the process proceeds to S810 and S811, similarly to the second embodiment.

As described above, in the third embodiment, even when it is difficult to detect the line-of-sight direction correctly, it is possible to prevent the motion performed without intention to operate the device by the driver from being erroneously recognized as the gesture, and it is possible to detect the motion intended for an operation as the gesture.

Further, similarly to the second embodiment, the display area of the virtual image of the HUD may be set such that the display area of the virtual image of the HUD is shifted to the right side or the left side, for example, according to the relative position between the driver and the navigation system such as a handle position (a right handle or a left handle) or a dominant eye of the driver. Moreover, when the driver is tall, the display area of the virtual image of the HUD may be set to be high, whereas when the driver is short, the display area of the virtual image of the HUD may be set to be low. The display area of the virtual image of the HUD may be set for each driver.

Further, similarly to the second embodiment, when the line of sight has not been detected in S3101 in FIG. 8B (No in S3101), the detected motion determining unit 7011 may count the number of non-detection, and perform the process of S3101 to S3105 first when the number of non-detection reaches a certain number of times within a certain period of time or when the number of non-detection reaches a certain number of times consecutively.

Further, in the present configuration, when it is difficult to detect the line of sight of the driver correctly through a series of operations (for example, a situation in which the driver's eyes are covered with her/his hand, sunglasses, or the like other than a situation in which the line-of-sight directions indicated by both eyes are not the same direction but crossed), similarly to the second embodiment, the detected motion determining unit 7011 may dismiss all the motion detection results obtained by the motion detecting unit 111, and when it is difficult to detect the line-of-sight direction correctly, the face direction may be used instead of the line-of-sight direction using the face direction detecting unit.

Further, in the present configuration, the position information of the HUD 108 is stored in the device position information recording unit 112. However, similarly to the second embodiment, when a display position or a display area of the HUD dynamically change, a configuration of sequentially receiving information of the display position and the display area of the HUD from the display content control unit 115 and updating information of the device position information recording unit 112 may be employed.

Further, the present configuration has been described in connection with the example in which the display device 103 includes the HUD 108 and the navigation screen 107, and the input device 104 includes the line of sight detection device 105, the face detection device 1051, and the camera 106. However, similarly to the second embodiment, the present system can be configured in various forms as long as the gesture detection device 401 can acquire information used to detect the line-of-sight direction or the face direction.

As described above, when the specified motion of the driver is detected, it is determined whether or not the detected motion is the motion with an intention to operate the device based on the line-of-sight direction or the gaze direction of the driver and the display position of the virtual image of the HUD. Thus, similarly to the first embodiment, it is possible to provide the gesture detection device that detects only the gesture performed in the vehicle with an intention to operate the device by the driver but does not detect the other motions (for example, the hand gesture toward the outside the vehicle) as the gesture to operate the device, and it is possible to implement an intuitive operation on the in-vehicle device in the vehicle, a reduction in time and error of an operation, and a seamless quick operation.

Further, the gesture detection device described in the present embodiment is not limited to an operation on content displayed on the navigation screen and the HUD and can be applied to any other device such as an air conditioner or an audio device or content displayed on a meter panel as well, similarly to the first embodiment.

In the first to third embodiments, the line-of-sight direction or the face direction of the driver is detected, and it is determined whether or not there is an operation on the navigation system or the HUD. However, there are cases in which the driver turns his/her eyes for only a moment due to glare caused by sunlight, a light of an opposite vehicle, or the like. For preparation of this case, for example, either of the line-of-sight direction calculating unit and the line-of-sight direction/distance of sight calculating unit or the detected motion determining unit may chronologically accumulate and record the calculated line-of-sight direction or the face direction of the driver and the coordinate data of the distance of sight in the device position information recording unit 112 at intervals of seconds, and even when the detected motion determining unit determines that the line-of-sight direction or the face direction is determined to be not the direction of the navigation screen or the HUD, or the distance of sight is determined to be not the distance of the navigation screen or the HUD, if an immediately previous or next line-of-sight direction or an immediately previous or next face direction is determined to be the direction of the navigation screen or the HUD, or an immediately previous or next distance of sight is determined to be the distance of the navigation screen or the HUD, the driver may be determined to turn the line of sight or the face away from the direction of the navigation screen or the HUD due to the above-described reason, and an operation during that period of time may be continued as an operation on the navigation screen or the HUD.

Figure 2D:
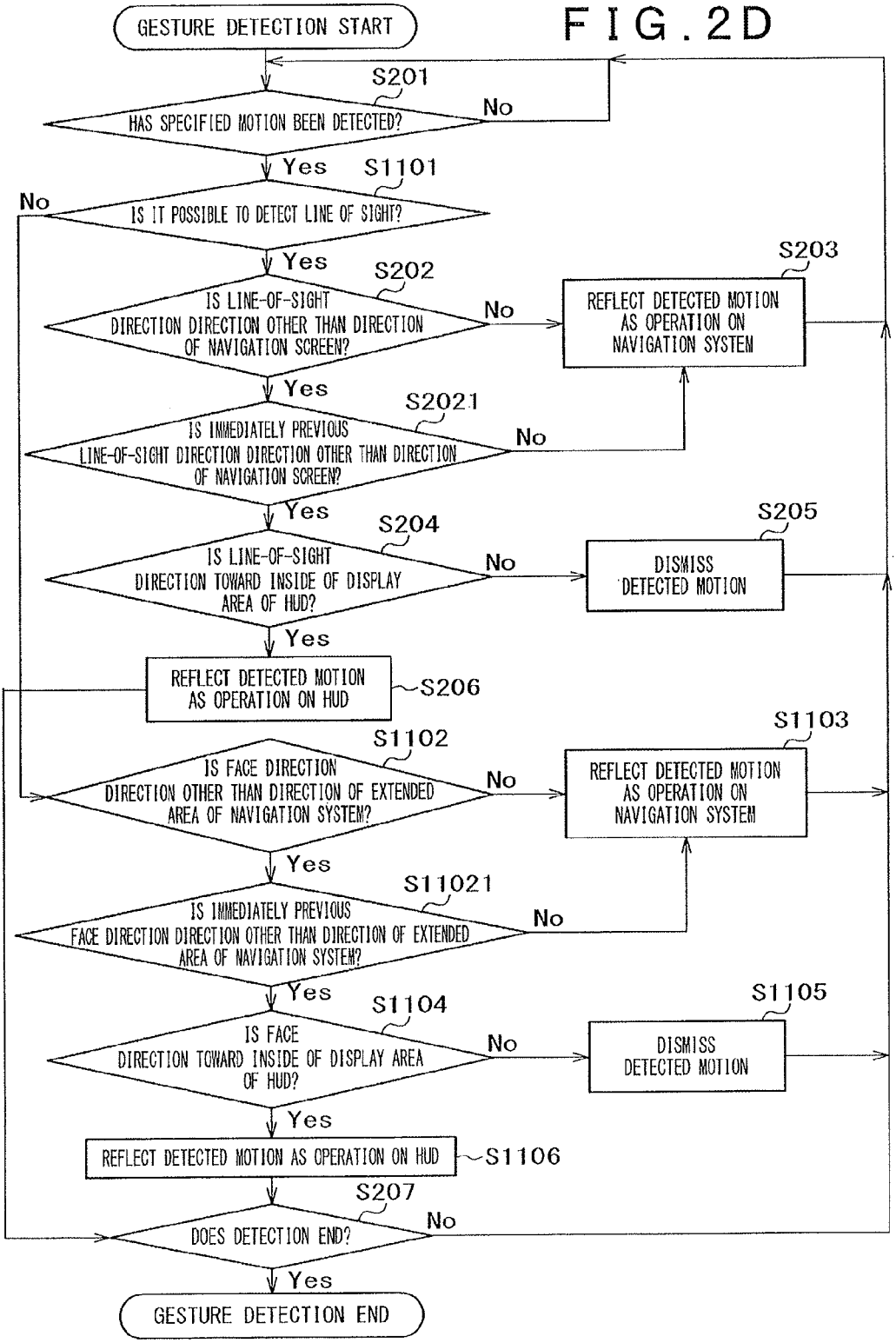
FIG. 2D is an operation flow (a line of sight or a face is turned away) at the time of gesture detection according to the first embodiment of the present invention.

For example, in the first embodiment, as illustrated in FIG. 2D, even when the line-of-sight direction is determined to be not the direction of the navigation system (No in S202), the detected motion determining unit 113 may determines whether or not an immediately previous line-of-sight direction recorded in the device position information storage unit 112 is the direction other than the direction of the navigation system (S2021). When the immediately previous line-of-sight direction recorded in the device position information storage unit 112 is determined to be toward the navigation system (No in S2021), the process may proceed to S203, and the detected motion may be reflected as an operation on the navigation system. Even when the detected motion determining unit 113 determines that the face direction is not the direction of the navigation system (No in S1102), it may be determined whether or not an immediately previous face direction recorded in the device position information storage unit 112 is the direction other than the direction of the navigation system (S11021). When the immediately previous face direction recorded in the device position information storage unit 112 is determined to be toward the navigation system (No in S11021), the process may proceed to S1103, and the detected motion may be reflected as an operation on the navigation system. In the second and third embodiments, the same process can be performed. As described above, even when the driver turns his/her eyes for only a moment due to glare caused by sunlight, a light of an opposite vehicle, or the like, it is possible to operate the navigation system or the HUD correctly.

The processes in the above embodiments are implemented by programs, and the programs have a module configuration including the above-described respective units (for example, the respective units such as the line-of-sight direction determining unit, the motion detecting unit, and the detected motion determining unit). As actual hardware, as a CPU reads the programs from the recording medium and executes the programs, the respective units are loaded onto a main storage device, and the respective units such as the line-of-sight direction determining unit, the motion detecting unit, and the detected motion determining unit are generated on the main storage device.

Although particularly described in the above embodiments, each of the programs may be recorded in a computer readable recording medium such as a CD-ROM, a FD, a CD-R, a Digital Versatile Disc (DVD) as a file of an installable format or an executable format and provided or may be stored on a computer connected to a network such as the Internet and provided or distributed by downloading via a network. Of course, each of the programs may be installed in a ROM or the like in advance and provided as well.

REFERENCE SIGNS LIST 101, 401, 701 Gesture detection device
102, 402, 702 In-vehicle device
103 Display device
104 Input device
105 Line of sight detection device
1051 Face detection device
106 Camera
107 Navigation screen
108 Head up display (HUD)
109 Gesture detection control unit
110 Line-of-sight direction calculating unit
1101 Face direction calculating unit
111 Motion detecting unit
112 Device position information recording unit
113, 4013, 7011 Detected motion determining unit
114 In-vehicle device control unit
115 Display content control unit
302 HUD
303 Front glass
4011 Line-of-sight direction/distance of sight calculating unit
4012 Gaze area calculating unit
4014 HUD virtual image position calculating unit
601 HUD virtual image
602, 903 Driver gaze area
603, 904 HUD display area
7012 Vehicle outside recognizing unit
7031 Outside camera
901 Pedestrian
902 Other car

The invention claimed is:

1. An in-vehicle gesture detection system comprising:
one or more first imagers that capture images of a driver of a vehicle;
one or more second imagers that capture images of objects in front of the vehicle;
a heads up display (HUD); and
an in-vehicle processor communicatively coupled to the one or more first imagers, the one or more second imagers and the HUD;
wherein the in-vehicle processor:
detects motion of the driver and a face direction of the driver based on the images of the driver captured by the one or more first imagers;
recognizes objects outside of the vehicle based on the images of objects captured by the one or more second imagers;
determines whether or not the motion detected is intended to control content of the HUD based on the objects recognized outside of the vehicle and the face direction of the driver and
controls the content of the HUD on a condition that the motion detected is determined to be intended to control the content of the HUD.

2. An in-vehicle gesture detection system, comprising:
one or more first imagers that capture images of a driver of a vehicle;
one or more second imagers that capture images of objects in front of the vehicle; and
an in-vehicle processor communicatively coupled to the one or more first imagers and the one or more second imagers;
wherein the in-vehicle processor:
detects motion of the driver based on the images of the driver captured by the one or more first imagers;
recognizes objects outside of the vehicle based on the images of objects captured by the one or more second imagers;
determines a line-of-sight direction and a distance-of-sight of the driver based on the images of the driver captured by the one or more first imagers;
calculates a gaze area of the driver based on the line-of-sight direction and the distance-of-sight of the driver;
calculates a virtual image area serving as an area of a displayed virtual image;
determines whether or not the motion of the driver detected is intended to control content of the virtual image based on the gaze area, the objects recognized outside of the vehicle and the virtual image area; and
controls the content of the virtual image on a condition that the motion of the driver detected is intended to control the content of the virtual image.

3. The system according to claim 2,
wherein the in-vehicle processor further:
detects a face direction of the driver based on the images captured by the one or more first imagers, and
wherein the determination of whether or not the motion of the driver is further based on the face direction of the driver.

4. A gesture detection system, comprising:
one or more first imagers that capture images of a user;
one or more second imagers that capture images of objects of a field of view of the user;
a display; and
a processor communicatively coupled to the one or more first imagers and the one or more second imagers;
wherein the processor:
detects a motion of the user based on the images of the user captured by the one or more first imagers;
calculates a gaze area of the user based on a line-of-sight direction and a distance-of-sight of the user based on the images captured by the one or more first imagers;
calculates a position of a moving object based on the images of objects detected by the one or more second imagers;
determines whether or not the motion detected is intended to control content of the display based on the gaze area and the position of the moving object; and
controls the content of the display on a condition that the motion detected is intended to control the content of the display.

5. The system according to claim 4,
wherein the processor further:
detects a face direction of the user; and wherein the determination whether or not the motion detected is intended to control content of the display is further based on the face direction of the user and the position of the moving object.

6. The system according to claim 1,
wherein the in-vehicle processor further:
when a line of sight of the driver has not been detected or when the line of sight of the driver has not been detected continuously, counts a number of non-detections, and when the number of non-detections reaches a predetermined value,
the determination of whether or not the motion of the driver intended to control content of the display is based on the face direction.

7. The system according to claim 1,
wherein the in-vehicle processor further:
decides an area including position information based on a relative position between the driver and the HUD.

8. The system according to claim 1, further comprising:
a storage unit communicatively coupled to the in-vehicle processor;
wherein the in-vehicle processor further:
chronologically accumulates and records coordinate data of the face direction in the storage unit, and
when the motion of the driver detected is determined to not be intended to control content of the HUD, if an immediate previous or next face direction stored in the storage unit is in the direction of the HUD, the detected motion of the driver is determined to be intended to control content of the HUD.

9. The system according to claim 2, further comprising:
a storage unit communicatively coupled to the in-vehicle processor;
wherein the in-vehicle processor further:
chronologically accumulates and records coordinate data of the line-of-sight direction and the distance-of-sight in the storage unit, and
when the motion of the driver detected is determined to not be intended to control content of the virtual image, if an immediately previous or next line-of-sight direction and an immediately previous or next distance-of-sight stored in the storage unit are in the direction of the virtual image, the detected motion is determined to be intended to control content of the virtual image.

10. A gesture detection method, comprising:
capturing, by one or more first imagers, images of a driver of a vehicle;
capturing, by one or more second imagers, images of objects in front of the vehicle;
detecting motion of the driver and a face direction of the driver based on the images captured of the driver of the vehicle;
recognizing objects outside of the vehicle based on the images of objects captured by the one or more second imagers;
determining whether or not the motion detected is intended to control content of a display based on the objects recognized outside of the vehicle and the face direction of the driver; and
controlling the content of the display on a condition that the motion detected is determined to be intended to control content of the display.

11. A non-transitory computer-readable storage medium storing a set of instructions for execution by one or more processors to perform gesture detection, the set of instructions comprising:
acquiring images of a driver of a vehicle from one or more first imagers;
acquiring images of objects in front of the vehicle from one or more second imagers;
detecting motion of the driver and a face direction of the driver based on the images of the driver;
recognizing objects outside of the vehicle based on the images of objects;
determining whether or not the motion detected is intended to control content of a display based on the objects recognized outside of the vehicle and the face direction of the driver; and
controlling the content of the display on a condition that the motion detected is determined to be intended to control content of the display.

* * * * *